(12) United States Patent
Murakami et al.

(10) Patent No.: US 10,527,818 B2
(45) Date of Patent: *Jan. 7, 2020

(54) LENS DRIVING DEVICE, CAMERA MODULE, AND CAMERA MOUNTING DEVICE

(71) Applicants: Tomoyuki Murakami, Tokyo (JP); Ichiro Hayashi, Tokyo (JP); Shota Kudo, Tokyo (JP)

(72) Inventors: Tomoyuki Murakami, Tokyo (JP); Ichiro Hayashi, Tokyo (JP); Shota Kudo, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 15/854,852

(22) Filed: Dec. 27, 2017

(65) Prior Publication Data

US 2018/0120532 A1     May 3, 2018

Related U.S. Application Data

(63) Continuation of application No. 15/319,848, filed as application No. PCT/JP2015/003048 on Jun. 18, 2015, now Pat. No. 9,915,802.

(30) Foreign Application Priority Data

Jul. 11, 2014    (JP) .................................. 2014-143589

(51) Int. Cl.
*G02B 7/09*     (2006.01)
*G02B 7/10*     (2006.01)
(Continued)

(52) U.S. Cl.
CPC ............... *G02B 7/09* (2013.01); *G02B 7/102* (2013.01); *G02B 27/646* (2013.01); *H04M 1/0264* (2013.01)

(58) Field of Classification Search
None
See application file for complete search history.

(56) References Cited

U.S. PATENT DOCUMENTS 9,915,802 B2 *   3/2018   Murakami ............... G02B 7/04
2007/0206934 A1   9/2007   Ishii et al.
(Continued)

FOREIGN PATENT DOCUMENTS

JP    8-248292 A    9/1996
JP    10-225083 A   8/1998
(Continued)

OTHER PUBLICATIONS

International Search Report from International Application No. PCT/JP2015/003048 dated Sep. 15, 2015.
(Continued)

*Primary Examiner* — William B Perkey
(74) *Attorney, Agent, or Firm* — Brundidge & Stanger, P.C.

(57) ABSTRACT

Provided is a technology which: has a structure that is advantageous for size reduction and power saving; and, moreover, is useful when automatic focusing using a closed-loop control system. A lens driving device comprising: an autofocus driving unit; a Hall element which separates an autofocus magnet section; a first position detection magnet which is disposed near the Hall element; and a second position detection magnet which has the same configuration as the first position detection magnet and is disposed in a point symmetrical position relating to the first position detection magnet and the optical axis direction.

6 Claims, 16 Drawing Sheets

(51) Int. Cl.
 *G02B 27/64* (2006.01)
 *H04M 1/02* (2006.01)

(56) References Cited

U.S. PATENT DOCUMENTS

| | | |
|---|---|---|
| 2014/0177056 A1 | 6/2014 | Hayashi |
| 2014/0368915 A1 | 12/2014 | Hu |
| 2016/0025995 A1 | 1/2016 | Ariji |
| 2017/0115466 A1 | 4/2017 | Murakami |
| 2017/0192195 A1 | 7/2017 | Murakami |

FOREIGN PATENT DOCUMENTS

| | | |
|---|---|---|
| JP | 2012-177753 A | 9/2012 |
| JP | 2013-024938 A | 2/2013 |
| JP | 2013-210550 A | 10/2013 |
| JP | 2014-130044 A | 7/2014 |
| JP | 2015-034910 A | 2/2015 |

OTHER PUBLICATIONS

Extended European Search Report issued in EP 15819553.7 dated Feb. 1, 2018.

\* cited by examiner

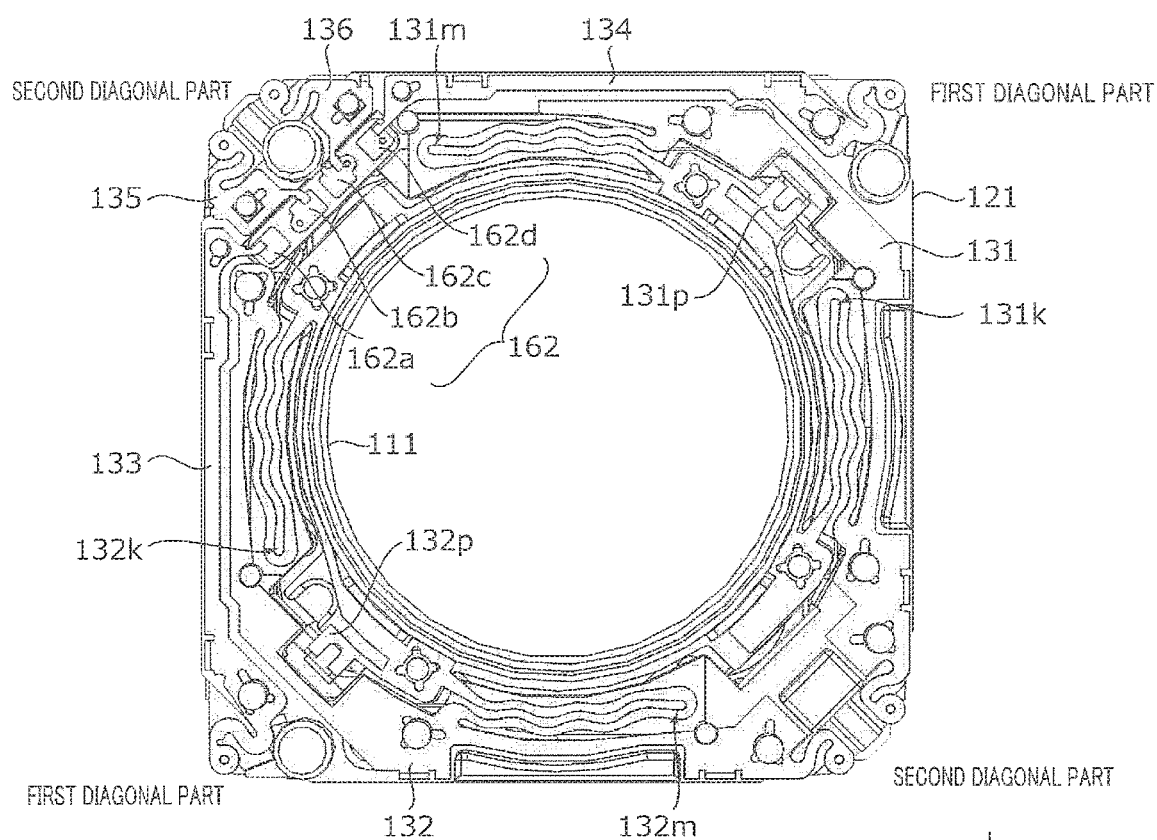
FIG. 6
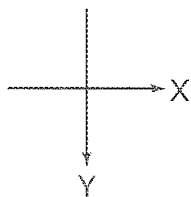

LENS DRIVING DEVICE, CAMERA MODULE, AND CAMERA MOUNTING DEVICE

CROSS-REFERENCE TO THE RELATED APPLICATION

The present application is a Continuation Application of application Ser. No. 15/319,848, filed Dec. 19, 2016, which claims priority from PCT/JP2015/003048, filed Jun. 18, 2015, the contents of which are incorporated herein by reference.

TECHNICAL FIELD

The present invention relates to an auto-focusing lens driving device, a camera module having an auto focus function, and a camera mounting device.

BACKGROUND ART

In general, a small-sized camera module is mounted in mobile terminals such as a smartphone. The lens driving device has an auto focus function of automatically performing focusing for capturing a subject (hereinafter referred to as "AF (Auto Focus) function"), and a shake correction function (hereinafter referred to as "OIS (Optical Image Stabilization) function") of optically correcting hand shake (vibration) upon capturing an image to reduce the irregularities of the image (for example, PTLS 1 and 2).

The auto-focusing and shake-correcting lens driving device includes an auto-focusing driving part (hereinafter referred to as "AF driving part") for moving the lens part in the light axis direction, and a shake-correcting driving part (hereinafter referred to as "OIS driving part") for swaying the lens part in a plane orthogonal to the light axis direction.

The AF driving part includes, for example, an auto-focusing coil part (hereinafter referred to as "AF coil part") disposed around the lens part, and an auto-focusing magnet part (hereinafter referred to as "AF magnet part") disposed separately from the AF coil part in the radial direction. An auto-focusing movable part (hereinafter referred to as "AF movable part") including the lens part and the AF coil part is moved with respect to an auto-focusing fixing part (hereinafter referred to as "AF fixing part") including the AF magnet part in the light axis direction by use of a driving force of a voice coil motor composed of the AF coil part and the AF magnet part, and thus focusing is automatically performed. The AF movable part and the AF fixing part are collectively referred to as "auto-focusing unit (AF unit)."

The OIS driving part includes a shake-correcting magnet part (hereinafter referred to as "OIS magnet part") disposed at the AF unit, and a shake-correcting coil part (hereinafter referred to as "OIS coil part") disposed separately from the OIS magnet part in the light axis direction, for example. A shake-correcting movable part (hereinafter referred to as "OIS movable part") including the AF unit and the OIS magnet part is supported by a supporting member so as to be separated from a shake-correcting fixing part (hereinafter referred to as "OIS fixing part") including the OIS coil part in the light axis direction. The OIS movable part is swayed in a plane orthogonal to the light axis direction by use of a driving force of a voice coil motor composed of the OIS magnet part and the OIS coil part, and thus shake correction is performed.

Further, PTLS 1 and 2 disclose a configuration in which the same magnet part is utilized as an OIS magnet part and an AF magnet part from the viewpoint of reducing the size and the height of the lens driving device. The magnet part serving as the OIS magnet part and as the AF magnet part is referred to as "driving magnet part."

In addition, PTL 2 proposes a configuration in which: a Hall device is disposed at an AF fixing part; a position detection magnet is disposed at an AF movable part; the position of the AF movable part is detected with the Hall device; and the operation of a voice coil motor of the AF driving part is controlled based on the detection result (so-called closed loop control method). With the closed loop control method, the hysteresis characteristics of the voice coil motor are not required to be considered, and stability of the position of the AF movable part can be detected. Furthermore, automatic focusing of the image surface detection method can be used. Accordingly, with high responsiveness, speedup of the automatic focusing operation can be achieved.

CITATION LIST

Patent Literature

PTL 1
Japanese Patent Application Laid-Open No. 2013-210550
PTL 2
Japanese Patent Application Laid-Open No. 2012-177753

SUMMARY OF INVENTION

Technical Problem

In the case where the driving magnet is disposed at the diagonal position of a square in a plane as viewed in the light axis direction as the lens driving device disclosed in PTL 2, the amount of the leakage flux of the driving magnet part is significantly small in regions around the center of each of the four sides of the square. In view of this, by disposing the position detection magnet and the Hall device in the above-mentioned regions, a magnetic circuit for detecting the position of the AF movable part can be easily formed.

In the lens driving device disclosed in PTL 1, four pieces of permanent magnets of a driving magnet part are disposed in a square frame shape. In this case, the effective magnetic flux is large in comparison with the layout of the permanent magnet disclosed in PTL 2, and accordingly the power consumption for moving the AF movable part can be reduced.

However, when detecting the position of the AF movable part with a configuration in which the position detection magnet is disposed at the AF movable part and the Hall device is disposed at the AF fixing part, the leakage flux of the driving magnet part has an influence to a certain degree since the permanent magnets are disposed at the four sides. When the distance between the driving magnet part and the position detection magnet, and Hall device is increased, the influence of the leakage flux of the driving magnet part can be reduced; however, the size of the lens driving device is undesirably increased.

Therefore, with a lens driving device in which a driving magnet part is composed of permanent magnets disposed in a square frame shape, it is difficult to perform a closed loop control for automatic focusing.

An object of the present invention is to provide a lens driving device which has a favorable structure for downsizing and power saving, and is suitable for performing automatic focusing by a closed loop control method, and a camera module and a camera mounting device including the lens driving device.

Solution to Problem

A lens driving device according to an embodiment of the present invention includes: an auto-focusing driving part, a Hall device, a first position detection magnet, and a second position detection magnet, the auto-focusing driving part including: an auto-focusing coil part disposed at a periphery of a lens part; and an auto-focusing magnet part composed of four permanent magnets and disposed separately from the auto-focusing coil part in a radial direction, the four permanent magnets being magnetized in a short direction and disposed in a square frame shape; the auto-focusing driving part being configured to perform automatic focusing by moving an auto focus movable part including the auto-focusing coil part in a light axis direction with respect to an auto focus fixing part including the auto-focusing magnet part by utilizing a driving force of a voice coil motor composed of the auto-focusing coil part and the auto-focusing magnet part; the Hall device being disposed separately from the auto-focusing magnet part in the light axis direction at a positon corresponding to one diagonal part of the auto-focusing magnet part such that a detection direction coincides with the light axis direction; the first position detection magnet being disposed in proximity to the Hall device such that a magnetization direction coincides with the light axis direction; the second position detection magnet having a configuration similar to that of the first position detection magnet, and being disposed at a position point symmetrical with the first position detection magnet about the light axis direction.

A camera module according to the embodiment of the present invention includes: the lens driving device; a lens part mounted to the auto focus movable part; and an image capturing part configured to capture a subject image imaged by the lens part.

A camera mounting device according to the embodiment of the present invention includes: the camera module; and the camera mounting device being an information device or a transport device.

Advantageous Effects of Invention

According to the present invention, the influence of magnetic flux leakage of the auto-focusing magnet part can be minimized, and the detection sensitivity of the Hall device is improved, and thus, the position of auto focus movable part in the light axis direction can be accurately detected. Accordingly, downsizing and power saving can be achieved, and it is suitable for automatic focusing using a closed loop control method.

BRIEF DESCRIPTION OF DRAWINGS

FIG. 6 is a plan view of the OIS movable part;

DESCRIPTION OF EMBODIMENT

In the following, an embodiment of the present invention is described in detail with reference to the drawings.

Figure 1A:
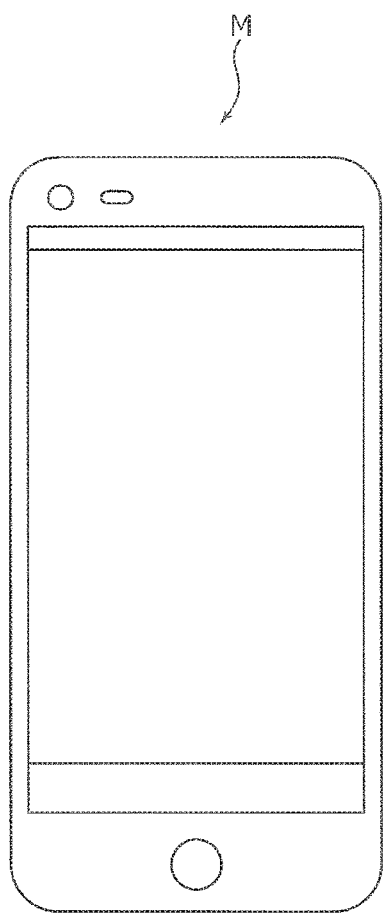
FIG. 1A is a front view of a smartphone in which a camera module according to an embodiment of the present invention is mounted.
Figure 1B:
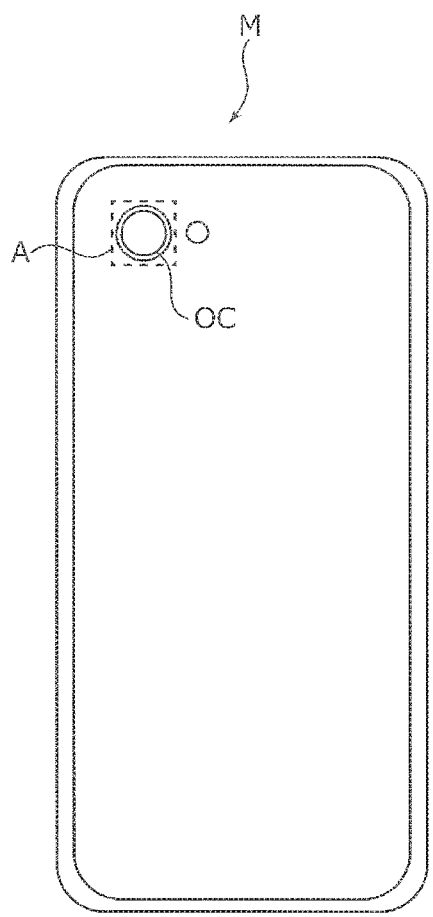
FIG. 1B is a rear view of the smartphone.

FIGS. 1A and 1B illustrate smartphone M in which camera module A according to the embodiment of the present invention is mounted. FIG. 1 A is a front view of smartphone M, and FIG. 1B is a back view of smartphone M.

For example, smartphone M is provided with camera module A as a back side camera OC. Camera module A has an auto focus function and a shake correction function, and can capture an image without image blurring by automatically performing focusing at the time of capturing a subject and by optically correcting hand shake (vibration) caused at the time of capturing an image.

Figure 2:
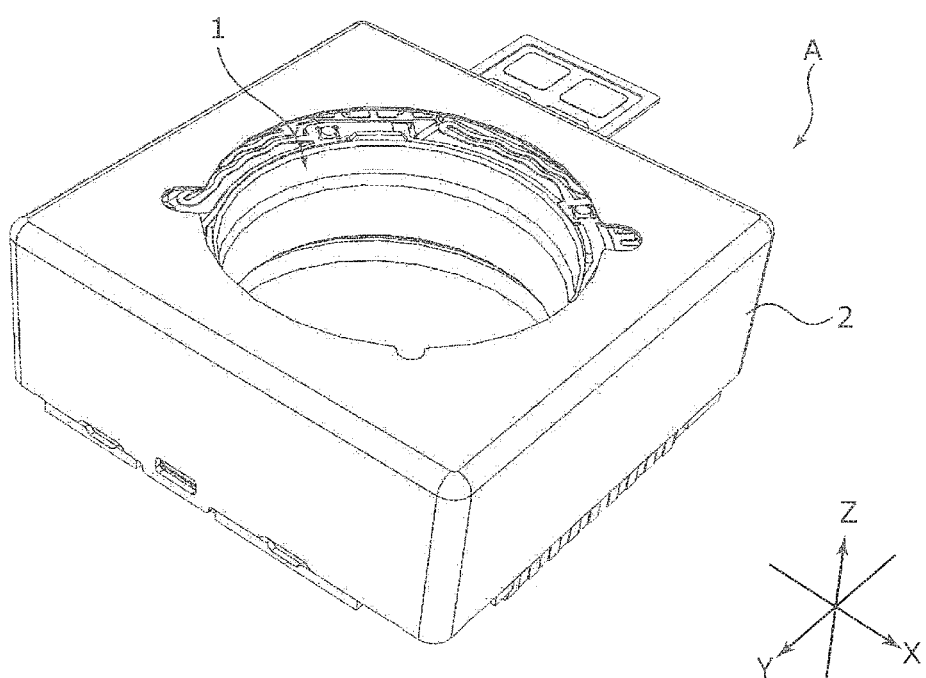
FIG. 2 is a perspective view of an external appearance of the camera module.
Figure 3:
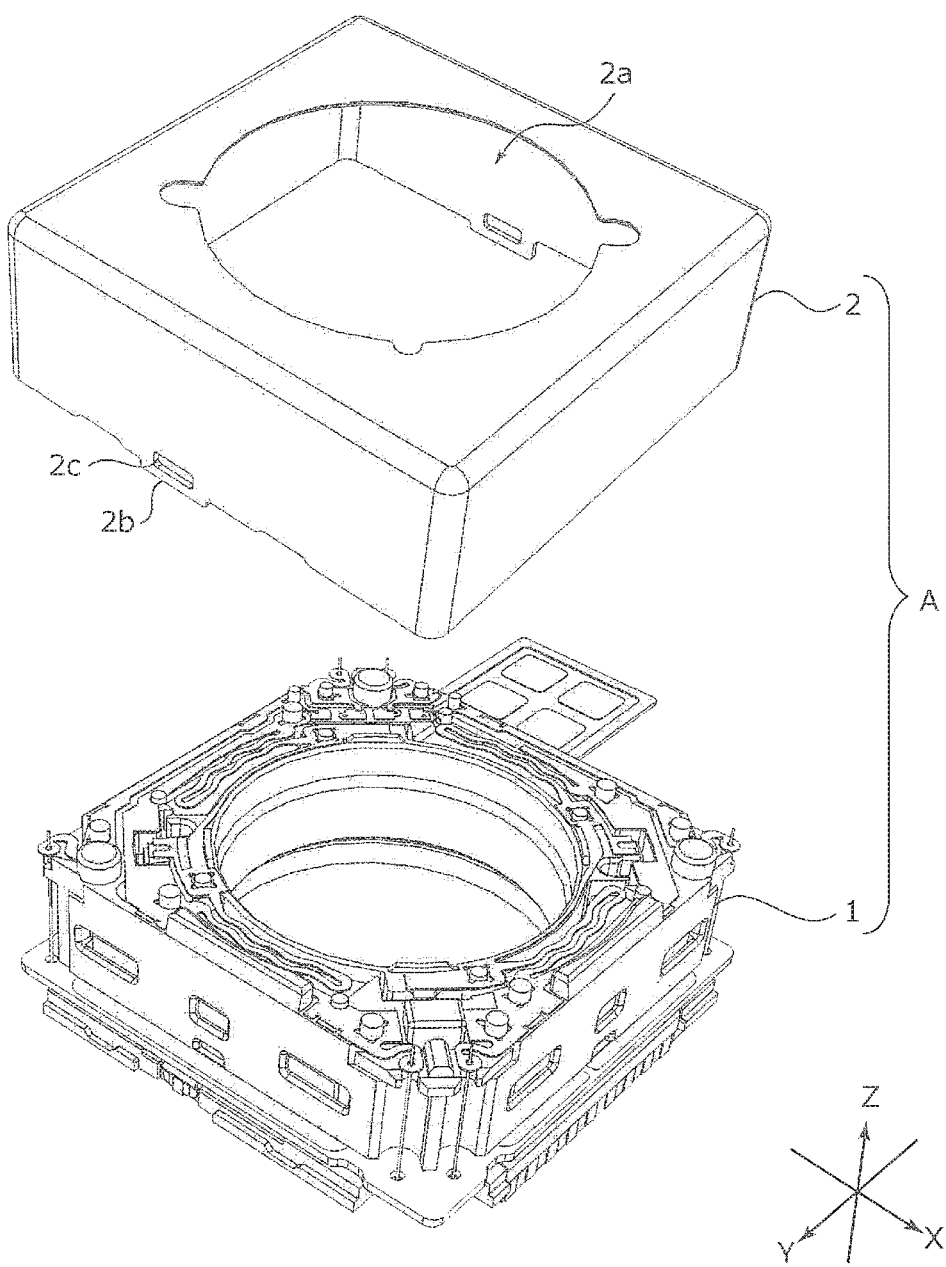
FIG. 3 is an exploded perspective view of the camera module.

FIG. 2 is a perspective view of an external appearance of camera module A. FIG. 3 is an exploded perspective view of camera module A. As illustrated in FIG. 2 and FIG. 3, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the imaging side in the light axis direction (also referred to as "infinity position side").

Camera module A includes a lens part (not illustrated in the drawing) in which a lens is housed in a lens barrel having a cylindrical shape, auto-focusing and shake-correcting lens driving device 1, an image capturing part (not illustrated in the drawing) that captures a subject image imaged with the lens part, shield cover 2 that covers the entirety, and the like.

As viewed in the light axis direction, shield cover 2 is a capped square cylindrical body having a square shape in plan view. Circular opening 2a is formed in the top surface of shield cover 2. A lens part (not illustrated in the drawing) is exposed to the outside through opening 2a. Shield cover 2 includes, at the bottom part, engagement piece 2b for mounting to lens driving device 1 (base member 23). Engagement piece 2b protrudes downward from the bottom part of shield cover 2. In addition, slit 2c is formed in engagement piece 2b to facilitate elastic deformation.

The image capturing part (not illustrated in the drawing) includes an imaging device (not illustrated in the drawing), and is disposed on the imaging side in the light axis direction of the lens driving device 1. The imaging device (not illustrated in the drawing) is composed of, for example, a CCD (charge coupled device) image sensor, a CMOS (complementary metal oxide semiconductor) image sensor, or the like. The imaging device (not illustrated in the drawing) captures a subject image imaged by a lens part (not illustrated in the drawing).

Figure 4:
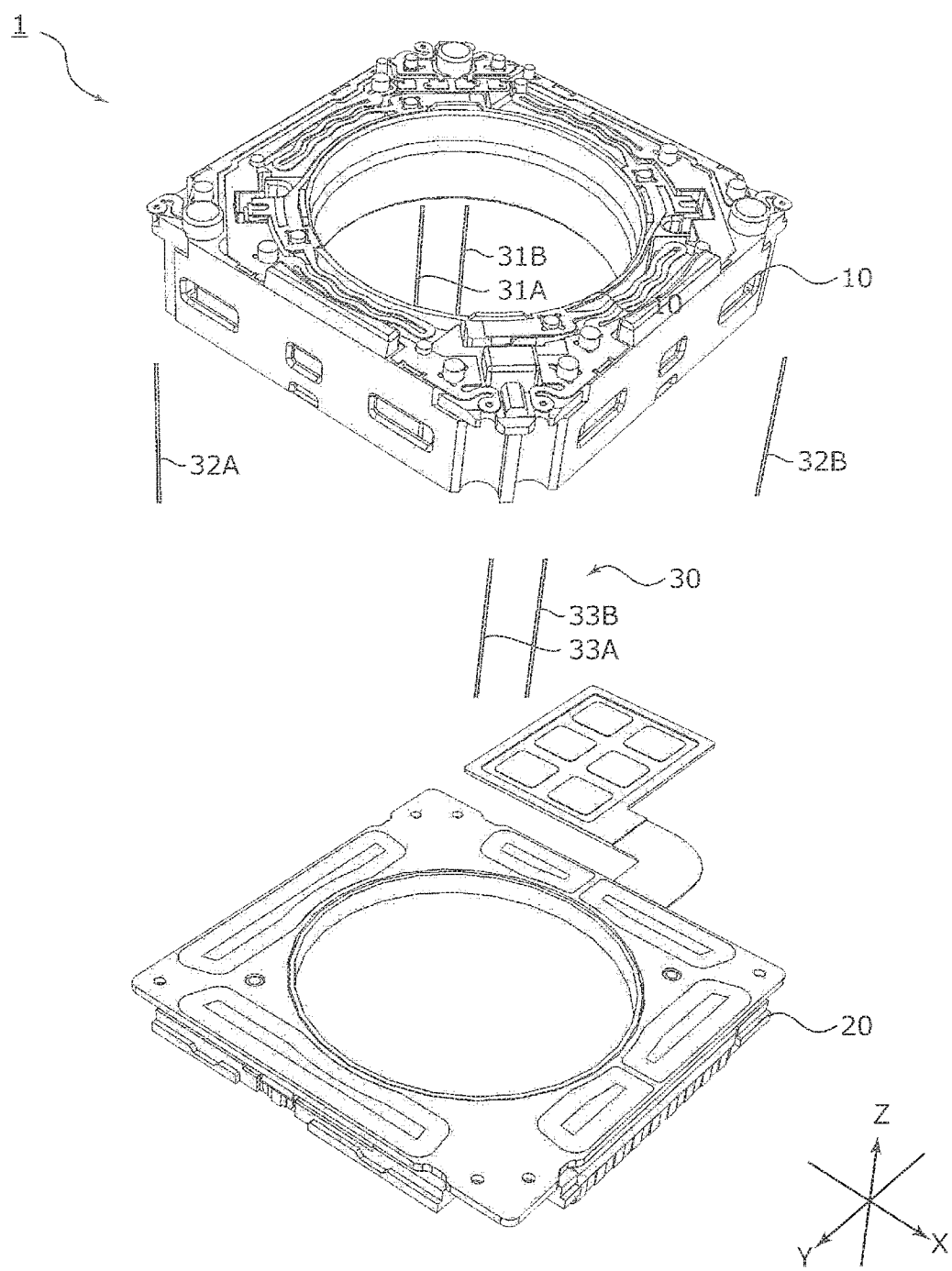
FIG. 4 is an exploded perspective view of a lens driving device.

FIG. 4 is an exploded perspective view of lens driving device 1. As illustrated in FIG. 4, lens driving device 1 includes OIS movable part 10, OIS fixing part 20, supporting member 30 and the like. OIS movable part 10 includes an OIS magnet part serving as a component of the OIS voice coil motor, and sways in the XY plane at the time of shake correction. OIS fixing part 20 includes an OIS coil part. That is, the OIS lens driving part of lens driving device 1 is of a moving magnet type. OIS movable part 10 is the "AF unit" including the AF driving part.

OIS movable part 10 is disposed on the light reception side in the light axis direction relative to OIS fixing part 20 and is separated from OIS fixing part 20. OIS movable part 10 is coupled with OIS fixing part 20 by supporting member 30. To be more specific, supporting member 30 is composed of six suspension wires extending along the Z direction (hereinafter referred to as "suspension wire 30"). One end (upper end) of suspension wire 30 is fixed to OIS movable part 10 (upper elastic supporting part 13), and the other end (lower end) of suspension wire 30 is fixed to OIS fixing part 20 (coil substrate 21). OIS movable part 10 is supported by suspension wire 30 such that OIS movable part 10 can sway in the XY plane.

In the present embodiment, in six suspension wires 30, suspension wires 31A and 31B are used as a signal path of Hall device 161 (see FIG. 5) (signal suspension wire), suspension wires 32A and 32B are used as a power feeding path of Hall device 161 (Hall device feeding suspension wire), and suspension wires 33A and 33B are used as a power feeding path of AF coil part 112 (see FIG. 5) (coil feeding suspension wire). It is to be noted that the number of suspension wires 30 are not limited, and seven or more suspension wires 30 may be provided.

Figure 5:
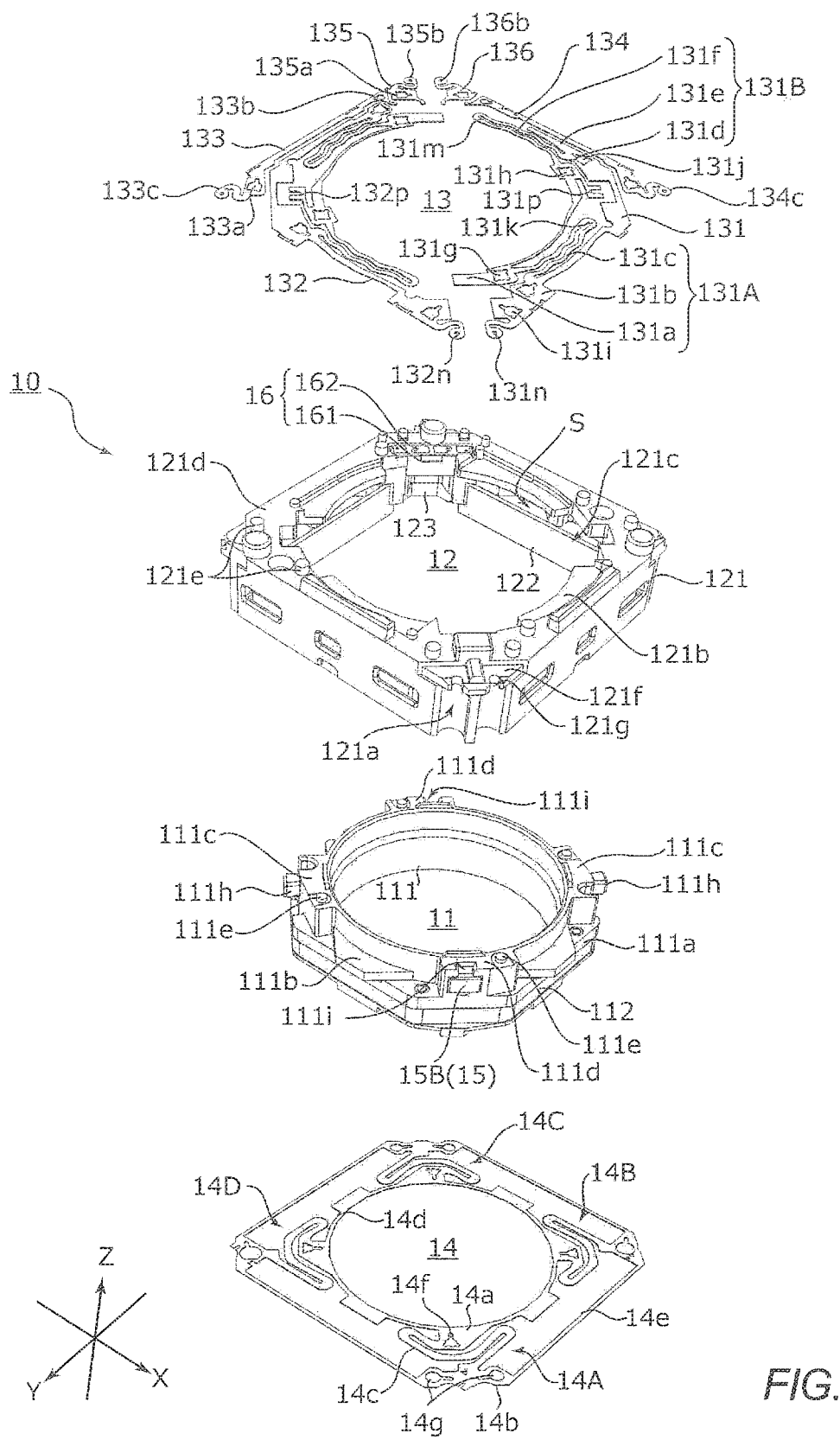
FIG. 5 is an exploded perspective view of an OIS movable part.
Figure 7:
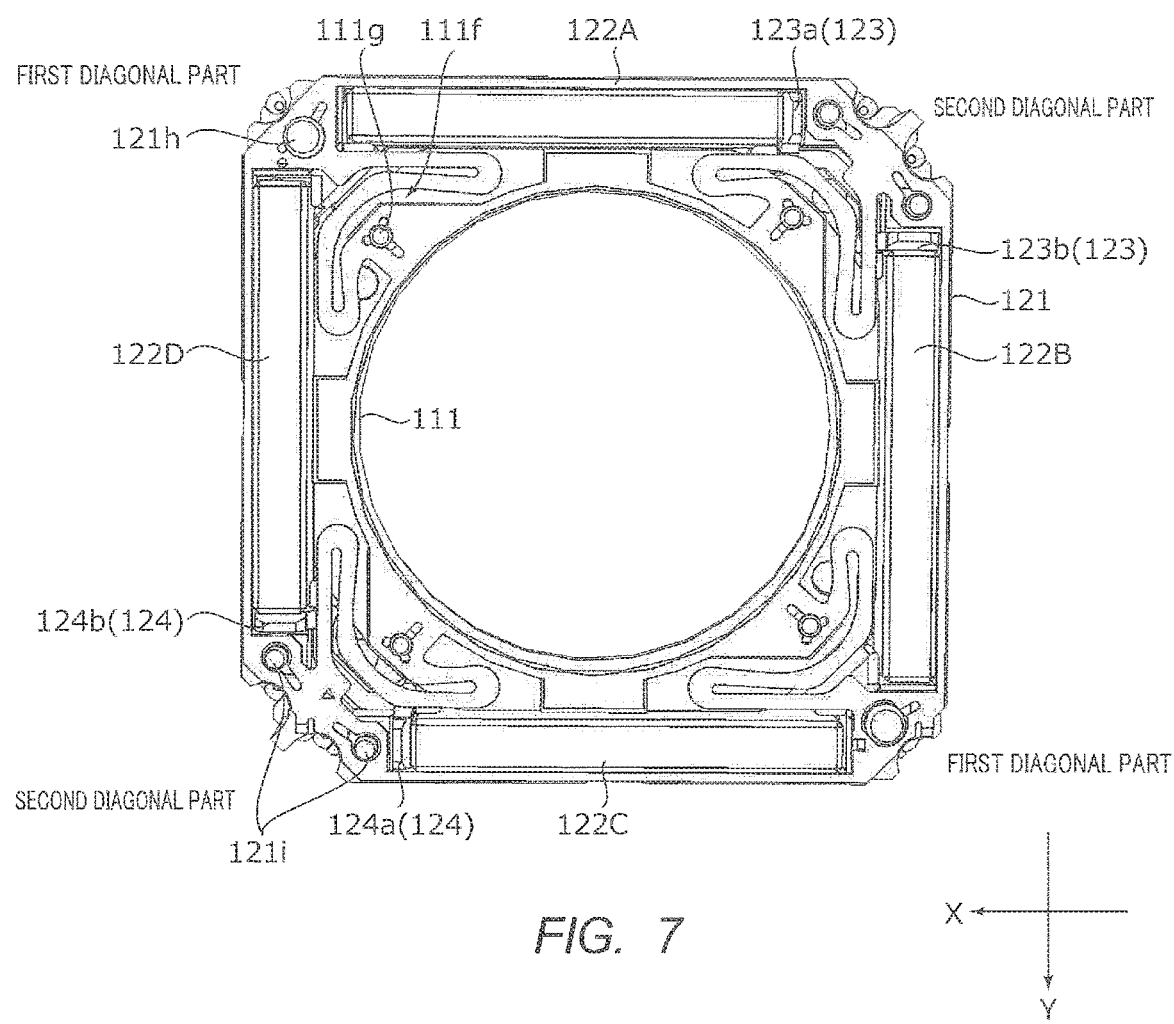
FIG. 7 is a bottom view of the OIS movable part.

FIG. 5 is an exploded perspective view of OIS movable part 10. FIG. 6 is a plan view of OIS movable part 10. FIG. 7 is a bottom view of OIS movable part 10. As illustrated in FIG. 5 to FIG. 7, OIS movable part 10 (AF unit) includes AF movable part 11, AF fixing part 12, upper elastic supporting part 13, lower elastic supporting part 14 and the like. AF movable part 11 is coupled with AF fixing part 12 by upper elastic supporting part 13 and lower elastic supporting part 14.

AF movable part 11 includes a coil part serving as a component of an AF voice coil motor, and moves in the light axis direction at the time of focusing. AF fixing part 12 includes a magnet part serving as a component of the AF voice coil motor. That is, the AF lens driving part of lens driving device 1 is of a moving coil type.

AF movable part 11 includes lens holder 111, AF coil part 112, and position detection magnet 15.

Lens holder 111 is a member having a cylindrical shape, and a lens part (not illustrated) is fixed on the inner peripheral surface by bonding or screwing. Lens holder 111 includes, at the lower half portion of the peripheral surface, coil winding part 111a having a chamfered quadrangular shape. Lens holder 111 includes, at four portions intersecting the X direction and the Y direction (hereinafter referred to as "cross direction") of the upper half portion of the peripheral surface, protruding parts 111b that radially outwardly protrude. Protruding parts 111b radially outwardly protrude over coil winding part 111a. The top surface of protruding part 111b serves as a locking part for restricting the movement of AF movable part 11 to the light reception side in the light axis direction, and the bottom surface of protruding part 111b serves as a locking part for restricting the movement of AF movable part 11 to the imaging side in the light axis direction.

Lens holder 111 includes, at four portions intersecting the directions (hereinafter referred to as "diagonal direction") rotated by 45 degrees from the cross direction of the upper half portion of the peripheral surface, protruding parts 111c and 111d. Protruding parts 111c and 111d serve as upper spring fixing parts (hereinafter referred to as "upper spring fixing parts 111c" and "upper spring fixing parts 111d") for fixing upper elastic supporting part 13.

Upper spring fixing parts 111c and 111d include upper bosses 111e for positioning and fixing upper elastic supporting part 13. In upper spring fixing parts 111c and 111d, two upper spring fixing parts 111c located at first diagonal parts include tying parts 111h that radially outwardly protrude. In upper spring fixing parts 111c and 111d, two upper spring fixing parts 111d located at second diagonal parts include magnet housing parts 111i for disposing position detection magnet 15.

Lens holder 111 includes, at the four corners of the bottom surface, lower spring fixing parts 111f for fixing lower elastic supporting part 14. Lower spring fixing parts 111f include lower bosses 111g for positioning and fixing lower elastic supporting part 14.

AF coil part 112 is an air-core coil that is energized at the time of focusing, and is wound around the outer peripheral surface of coil winding part 111a of lens holder 111. One end of AF coil part 112 is tied to one tying part 111h of lens holder 111 and the other end of AF coil part 112 is tied to the other tying part 111h.

Figure 8:
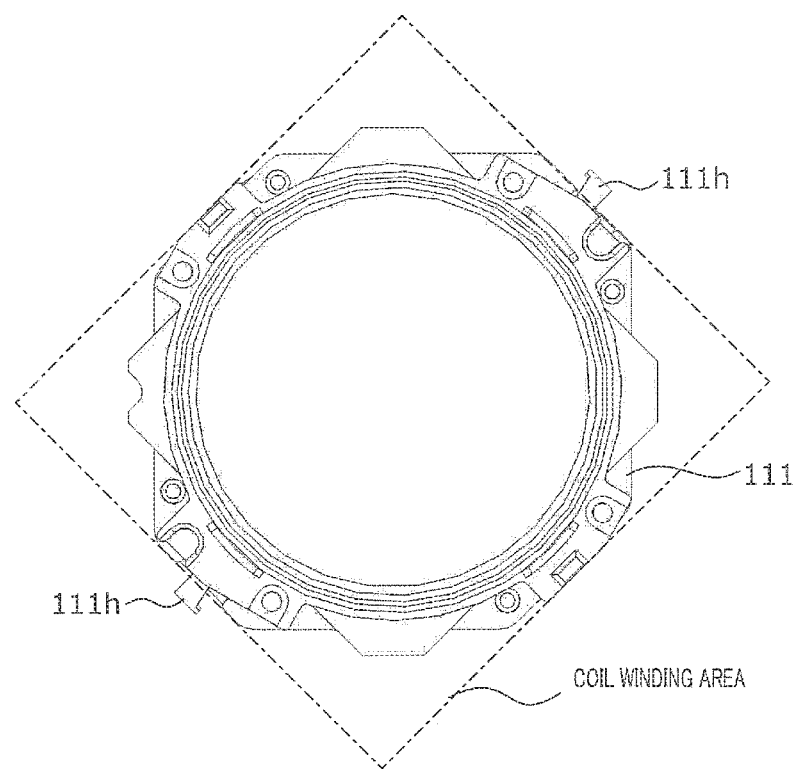
FIG. 8 is a plan view of a lens holder.
Figure 9:
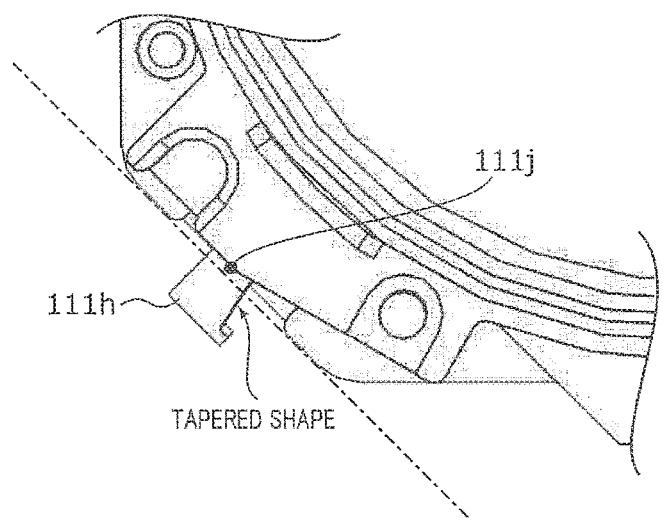
FIG. 9 is an enlarged view of a region around a tying part.

FIG. 8 and FIG. 9 illustrate a structure of tying part 111h of lens holder 111. FIG. 8 is a plan view of lens holder 111. FIG. 9 is an enlarged view illustrating a region around tying part 111h. Normally, AF coil part 112 is wound around coil winding part 111a of lens holder 111 by use of a winder, and thereafter both end portions thereof are tied to tying parts 111h. Conventionally, the tying part is disposed such that the base portion thereof is located on the outside relative to the coil winding area. The reason for this is that, when the base portion of the tying part is located on the inside relative to the coil winding area, the task of sequentially tying the end portion of AF coil part 112 from the base portion of the tying part is significantly difficult.

In view of this, in the present embodiment, tying part 111h has a tapered shape whose diameter is reduced toward the inner side in the radial direction, that is, toward base portion 111j. In this case, by performing the tying with tension, the end portion of AF coil part 112 is smoothly moved to the base portion 111j side, and is wound in array. In this manner, it is possible to dispose tying part 111h such that base portion 111j is located on the inner side relative to the coil winding area. That is, the outer dimension of lens holder 111 can be reduced without impairing the efficiency of the tying.

Position detection magnet 15 is disposed at magnet housing part 111i formed at upper spring fixing part 111d of lens holder 111. Detection magnet 15 that is disposed at a position on the side corresponding to position detection part 16 (hereinafter referred to as "first position detection magnet 15A" not illustrated in FIG. 5) is practically used for position detection of AF movable part 11. The other position detection magnet 15 (hereinafter referred to as "second position detection magnet 15B") is a dummy magnet that is not used for the position detection of AF movable part 11. Second position detection magnet 15B is disposed for balancing a magnetic force which acts on AF movable part 11 and stabilizing the orientation of AF movable part 11. Specifically, when second position detection magnet 15B is not disposed, a one-sided magnetic force is exerted on AF movable part 11 due to the magnetic field generated at magnet part 122, and the orientation of AF movable part 11 becomes unstable, and therefore, second position detection magnet 15B is disposed to prevent such a situation. Position detection magnet 15 is a samarium-cobalt magnet that has excellent temperature characteristics, and is suitable for the use under high temperature environment, for example.

AF fixing part 12 includes magnet holder 121, magnet part 122, and position detection part 16. While FIG. 5 illustrates a state where magnet holder 121 is attached on magnet part 122, magnet part 122 is attached after AF movable part 11 is inserted to magnet holder 121 in practice.

Magnet holder 121 has a quadrangular cylindrical shape which is square in plan view. Magnet holder 121 includes arc grooves 121a recessed inward in the radial direction at four coupling parts (four sides along the Z-axis direction) of the side walls. Suspension wires 30 are disposed at arc grooves 121a.

Magnet holder 121 includes, at the upper inner peripheral surface, four stopper parts 121b that protrude inward in the radial direction. Upper spring fixing part 111d of lens holder 111 is fitted into cutout part 121c where stopper part 121b is not formed.

Magnet holder 121 includes, at four corners of the upper part, upper spring fixing parts 121d that fix upper elastic supporting part 13. Upper spring fixing part 121d includes upper boss 121e for positioning and fixing upper elastic supporting part 13. The top surface of corner portion 121f of upper spring fixing part 121d is slightly recessed with respect to the surrounding portions so that a gap is formed when upper elastic supporting part 13 is attached thereto. In addition, corner portion 121f of upper spring fixing part 121d includes wire insertion part 121g through which suspension wire 30 is inserted.

Magnet holder 121 includes, at the four corners of the bottom surface, lower spring fixing parts (not illustrated) that fix lower elastic supporting part 14. Lower spring fixing parts (not illustrated) include lower bosses 121h for fixing and positioning lower elastic supporting part 14.

Magnet part 122 includes four cuboid permanent magnets 122A to 122D and coupling yoke 123. Permanent magnets 122A to 122D are disposed along the internal surfaces of the four side walls of magnet holder 121. Permanent magnets 122A and 122C are disposed to face each other in the Y direction, and permanent magnets 122B and 122D are disposed to face each other in the X direction. Protruding part 111b of lens holder 111 is located in space S between magnet part 122 and stopper part 121b of magnet holder 121.

Permanent magnets 122A to 122D are magnetized such that a magnetic field orthogonal to the radial direction is formed in AF coil part 112. For example, permanent magnets 122A to 122D are magnetized such that the inner periphery side is N pole and the outer periphery side is S pole. Permanent magnets 122A to 122D are neodymium magnets for example.

The AF voice coil motor is composed of magnet part 122 and AF coil part 112. In addition, magnet part 122 serves as the AF magnet part and as the OIS magnet part.

One of end surfaces of permanent magnet 122A in the longitudinal direction, and an end surface of adjacent permanent magnet 122B in the longitudinal direction are coupled with each other with coupling yoke 123 having a W-shape in plan view. Coupling yoke 123 includes yoke part 123a at one end portion thereof, and yoke part 123b at the other end portion thereof. Specifically, yoke part 123a is disposed at an end surface of permanent magnet 122A in proximity to first position detection magnet 15A, and yoke part 123b is disposed at an end surface of permanent magnet 122B in proximity to first position detection magnet 15A.

Likewise, one of end surfaces of permanent magnet 122C in the longitudinal direction, and an end surface of adjacent permanent magnet 122D in the longitudinal direction is coupled with each other with coupling yoke 124 having a W-shape in plan view. Yoke part 124a is disposed at an end surface of permanent magnet 122C in proximity to second position detection magnet 15B, and yoke part 124b is disposed at an end surface of permanent magnet 122D in proximity to second position detection magnet 15B.

Yoke parts 123a and 123b are used for suppressing intersection of the magnetic flux generated at magnet part 122 and the detection part of Hall device 161, that is, for reducing a leakage flux. With yoke parts 123a and 123b disposed in the above-mentioned manner, the detection sensitivity of Hall device 161 is improved. When yoke parts 123a and 123b are disposed, an attraction force is generated between first position detection magnet 15A and yoke parts 123a and 123b. Yoke parts 124a and 124b are disposed for balancing the magnetic force which acts on AF movable part 11, and for stabilizing the orientation of AF movable part 11.

While coupling yokes 123 and 124 are employed in the present embodiment, yoke parts 123a, 123b, 124a, and 124b may be independent members.

It should be noted that, preferably, yoke parts 123a and 123b are coupled with each other as described in the present embodiment. With such a configuration, the ease of attaching operation is remarkably reduced in comparison with the case where the yoke part is attached to each of permanent magnets 122A and 122B. In addition, an attraction force is generated also between first position detection magnet 15A and the coupling part that couples yoke part 123a and yoke part 123b, and therefore, by designing coupling yoke 123 such that an attraction force having a desired value is obtained, the thickness of yoke parts 123a and 123b can be reduced. Accordingly, the length of permanent magnets 122A and 122B can be increased, and therefore the driving performance of the AF driving part is improved. Furthermore, the above-mentioned configuration is useful for reinforcing the strength of AF fixing part 12.

Position detection part 16 is disposed at upper spring fixing part 121d located at the second diagonal part of four upper spring fixing parts 121d of magnet holder 121. Position detection part 16 includes Hall device 161 that detects variation of the magnetic field by utilizing the Hall effect, and position detection substrate 162 for power feeding to Hall device 161 and extraction of the detection signal. Hall device 161 includes detection part 161*a* composed of a semiconductor device (see FIG. 12), and is disposed such that the detection direction of detection part 161*a* coincides with the light axis direction. Position detection part 16 mainly detects the variation of the magnetic field of first position detection magnet 15A. With this configuration, the position of AF movable part 11 in the light axis direction is detected.

Upper elastic supporting part 13 is a leaf spring formed of beryllium copper, nickel copper, stainless-steel or the like, for example, and has a square shape as a whole in plan view. Upper elastic supporting part 13 includes upper leaf springs 131 and 132 that elastically support AF movable part 11 with respect to AF fixing part 12, power-source line parts 133 and 134 that feed power to Hall device 161, and signal line parts 135 and 136 that extract a detection signal from Hall device 161. Upper leaf springs 131 and 132, power-source line parts 133 and 134 and signal line parts 135 and 136 are shaped by punching and cutting a sheet metal.

Upper leaf spring 131 includes two spring parts 131A and 131B. Spring part 131A includes lens holder fixing part 131*a* that is fixed to lens holder 111, magnet holder fixing part 131*b* that is disposed at a position on the radially outside of lens holder fixing part 131*a* and is fixed to magnet holder 121, and arm part 131*c* that couples lens holder fixing part 131*a* and magnet holder fixing part 131*b*. Likewise, spring part 131B includes lens holder fixing part 131*d*, magnet holder fixing part 131*e*, and arm part 131*f*. Lens holder fixing parts 131*a* and 131*d* are coupled at a position on the inside of arm part 131*c*, and magnet holder fixing parts 131*b* and 131*e* are coupled at a position on the outside of arm part 131*c*.

Lens holder fixing parts 131*a* and 131*d* include fixation holes 131*g* and 131*h* corresponding to upper bosses 111*e* of lens holder 111. Magnet holder fixing parts 131*b* and 131*e* include fixation holes 131*i* and 131*j* corresponding to upper bosses 121*e* of magnet holder 121. Arm parts 131*c* and 131*f* include folded parts 131*k* and 131*m*, and extend in a wave shape in the XY plane. With such a shape, a twisting moment which acts on arm parts 131*c* and 131*f* can be reduced.

Upper leaf spring 131 includes wire connecting part 131*n* extending in a curved shape from magnet holder fixing part 131*b*. To wire connecting part 131*n*, suspension wire 33B for power feeding to AF coil part 112 (see FIG. 4) is connected. Upper leaf spring 131 includes tying connection part 131*p* extending from lens holder fixing part 131*d*. Tying connection part 131*p* is connected to one end of AF coil part 112 tied to one tying part 111*h* of lens holder 111.

Although the shape of upper leaf spring 132 is not completely identical to that of upper leaf spring 131, their basic structures are similar to each other, and therefore, the description thereof is omitted. To wire connecting part 132*n* of upper leaf spring 132, suspension wire 33A for power feeding to AF coil part 112 (see FIG. 4) is connected. In addition, tying connection part 132*p* is connected to the other end of AF coil part 112 tied to the other tying part 111*h* of lens holder 111.

Power-source line part 133 includes, at both end portions, fixation holes 133*a* and 133*b* corresponding to upper bosses 121*e* of magnet holder 121. Power-source line part 133 includes, at one end portion, wire connecting part 133*c* extending in a curved shape. To wire connecting part 133*c*, suspension wire 32A for power feeding to Hall device 161 (see FIG. 4) is connected. The other end of power-source line part 133 is connected to power source terminal 162*a* of position detection substrate 162.

The shape of power-source line part 134 is symmetrical with power-source line part 133. To wire connecting part 134*c* of power-source line part 134, suspension wire 32B for power feeding to Hall device 161 is connected. In addition, the other end of power-source line part 134 is connected to power source terminal 162*d* of position detection substrate 162.

Signal line part 135 includes fixation hole 135*a* corresponding to upper boss 121*e* of magnet holder 121. Signal line part 135 includes, at one end portion, wire connecting part 135*b* extending in a curved shape. To wire connecting part 135*b,* suspension wire 31A for extraction of a detection signal from Hall device 161 (see FIG. 4) is connected. The other end of signal line part 135 is connected to signal terminal 162*b* of position detection substrate 162.

The shape of signal line part 136 is symmetrical with signal line part 135. To wire connecting part 136*b* of signal line part 136, suspension wire 31B for extraction of a signal from Hall device 161 is connected. In addition, the other end of signal line part 136 is connected to signal terminal 162*c* of position detection substrate 162.

As with upper elastic supporting part 13, lower elastic supporting part 14 is a leaf spring made of beryllium copper, nickel copper, stainless-steel or the like (hereinafter referred to as "lower leaf spring 14"), and has a square shape as a whole in plan view. Lower leaf spring 14 elastically supports AF movable part 11 with respect to AF fixing part 12. Lower leaf spring 14 is shaped by punching and cutting a sheet metal.

Lower leaf spring 14 includes four spring parts 14A to 14D. Each of spring parts 14A to 14D includes lens holder fixing part 14*a* fixed to lens holder 111, magnet holder fixing part 14*b* disposed at a position radially outside of lens holder fixing part 14*a* and fixed to magnet holder 121, and arm part 14*c* that couples lens holder fixing part 14*a* and magnet holder fixing part 14*b*. Arm part 14*c* has a zigzag shape.

Lens holder fixing parts 14*a* adjacent to each other are coupled by inner ring part 14*d*. Magnet holder fixing parts 14*b* adjacent to each other are coupled by outer ring part 14*e*. Lens holder fixing part 14*a* includes fixation hole 14*f* corresponding to lower boss 111*g* of lens holder 111. Magnet holder fixing part 14*b* includes fixation hole 14*g* corresponding to lower boss 121*i* of magnet holder 121.

At the time of assembling OIS movable part 10, first, position detection part 16 (Hall device 161 and position detection substrate 162) is attached to magnet holder 121, and coupling yokes 123 and 124 are attached to the yoke housing part (not illustrated) of magnet holder 121. Then, upper elastic supporting part 13 is attached to upper spring fixing part 121*d*.

At this time, one ends of power-source line parts 133 and 134 are soldered and electrically connected to power source terminals 162*a* and 162*d* of position detection substrate 162. In addition, one ends of signal line parts 135 and 136 are soldered and electrically connected to signal terminals 162*b* and 162*c* of position detection substrate 162.

Further, a damper (not illustrated) is disposed between folded parts 131*m* and 131*k* of upper leaf spring 131 and magnet holder 121, and between folded parts 132*m* and 132*k* of upper leaf spring 132 and magnet holder 121. With this configuration, generation of unnecessary resonance (high-order resonance mode) is suppressed, and operation stability can be ensured. The damper can be readily applied by use of a dispenser. For example, ultraviolet curing silicone gel can be adopted as the damper.

Next, lower leaf spring 14 is attached to lower spring fixing part 111*f* of lens holder 111, and in this state, lens holder 111 is fitted into magnet holder 121 from the imaging side in the light axis direction. At this time, upper spring fixing part 111d of lens holder 111 is fitted to cutout part 121c of magnet holder 121. Then, upper leaf springs 131 and 132 are attached to upper spring fixing part 111d of lens holder 111. In addition, lower leaf spring 14 is attached to a lower spring fixing part (not illustrated) of magnet holder 121.

At this time, tying connection part 131p of upper leaf spring 131 is soldered and electrically connected to one end of AF coil part 112 tied to one tying part 111h of lens holder 111. Likewise, tying connection part 132p of upper leaf spring 132 is soldered and electrically connected to the other end of AF coil part 112 tied to the other tying part 111h of lens holder 111.

Next, permanent magnets 122A to 122D are inserted from a region surrounded by outer ring part 14e and arm part 14c of lower leaf spring 14, and bonded to magnet holder 121. At the same time, yoke part 123a of coupling yoke 123 is bonded to an end surface of permanent magnet 122A in the longitudinal direction, and yoke part 123b of coupling yoke 123 is bonded to an end surface of permanent magnet 122B in the longitudinal direction. In addition, yoke part 124a of coupling yoke 124 is bonded to an end surface of permanent magnet 122C in the longitudinal direction, and yoke part 124b of coupling yoke 124 is bonded to an end surface of permanent magnet 122D in the longitudinal direction. In this manner, OIS movable part 10 (AF driving part) is assembled.

As described, lens driving device 1 includes: AF coil part (112) disposed at a periphery of a lens part; AF magnet part (122) disposed separately in a radial direction from AF coil part (112) composed of four permanent magnets (122A to 122D) which are magnetized in a short direction (inner-and-outer direction) and disposed in a square frame shape; and AF driving part (OIS movable part 10) configured to perform automatic focusing by moving AF movable part (11) including AF coil part (112) in a light axis direction with respect to AF fixing part (12) including AF magnet part (122) by utilizing a driving force of a voice coil motor composed of AF coil part (112) and AF magnet part (122).

Figure 10:
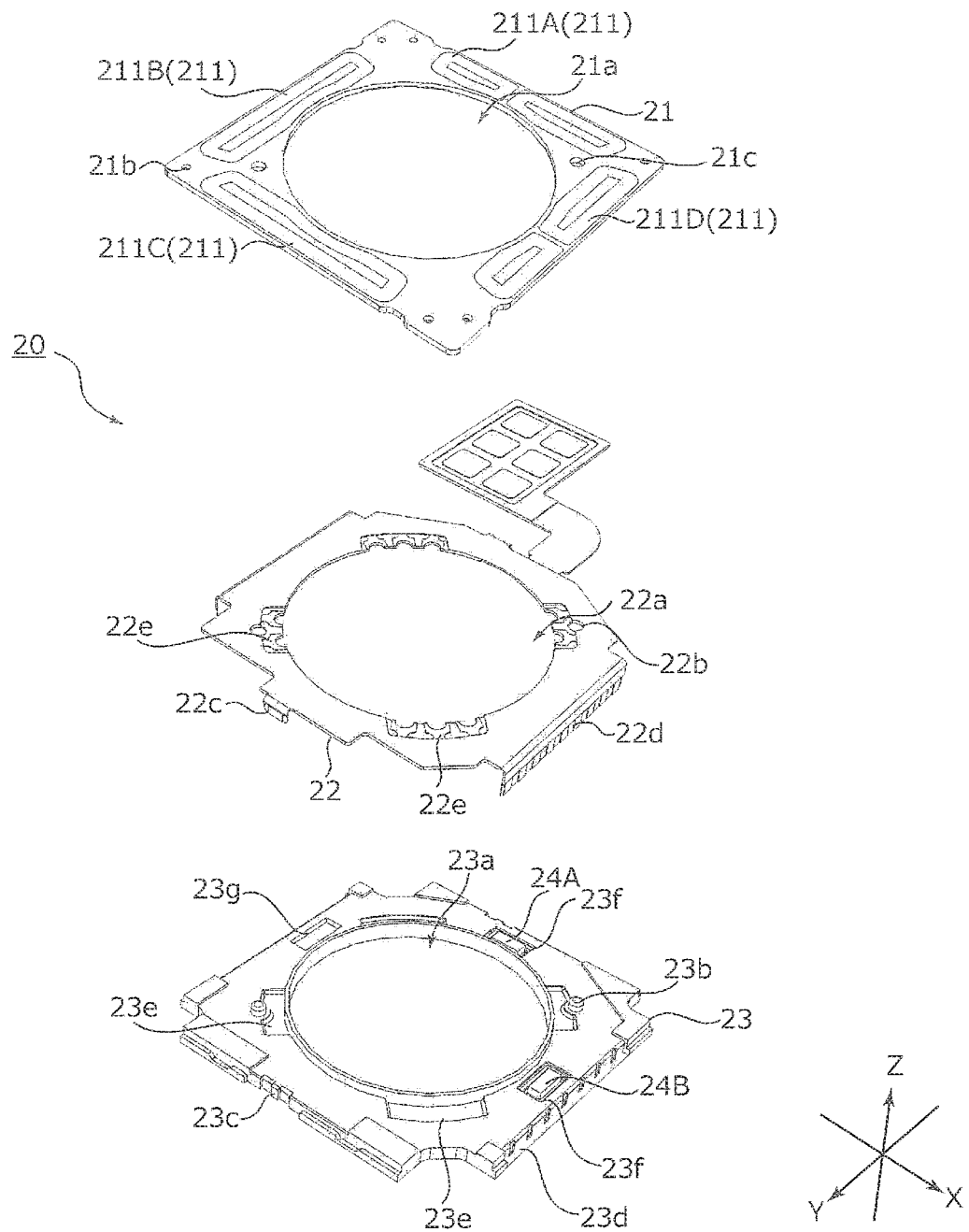
FIG. 10 is an exploded perspective view of the OIS fixing part.

FIG. 10 is an exploded perspective view of OIS fixing part 20. As illustrated in FIG. 10, OIS fixing part 20 includes coil substrate 21, sensor substrate 22, base member 23 and the like.

In plan view, coil substrate 21 has a square shape, and has circular opening 21a at a center portion. Coil substrate 21 includes, at the four corners, wire fixation holes 21b through which the other end (lower end) of suspension wire 30 is inserted. In addition, coil substrate 21 includes, at positions which intersect the diagonal direction of peripheral portions of opening 21a, positioning holes 21c.

Coil substrate 21 includes OIS coil part 211 at a position opposite to magnet part 122 in the light axis direction. OIS coil part 211 includes four OIS coils 211A to 211 D corresponding to permanent magnets 122A to 122D. The sizes and positions of OIS coils 211A to 211 D and permanent magnets 122A to 122D are set such that the magnetic field radiated from the bottom surfaces of permanent magnets 122A to 122D traverses the long side portions of OIS coils 211A to 211 D in the Z direction. The OIS voice coil motor is composed of magnet part 122 and OIS coil part 211.

As with coil substrate 21, sensor substrate 22 has a square shape in plan view, and has circular opening 22a at a center portion. Sensor substrate 22 includes, at peripheral portions of opening 22a, positioning holes 22b at positions corresponding to positioning holes 21c of coil substrate 21.

Sensor substrate 22 includes, at the two sides along the X direction, first lock pieces 22c that are bent downward. In addition, sensor substrate 22 includes, at the two sides along the Y direction, second lock pieces 22d that are bent downward. The power source terminal and the signal terminal are disposed at second lock piece 22d.

Sensor substrate 22 includes power source terminal 22e for power feeding to OIS coil part 211 at four portions of the inner peripheral edge of opening 22a which intersect the diagonal direction. In addition, sensor substrate 22 includes a power-source line (not illustrated) for power feeding to AF coil part 112 and OIS coil part 211, and a signal line (not illustrated) for a detection signal output from Hall devices 24A and 24B.

As with coil substrate 21, base member 23 has a square shape in plan view, and has circular opening 23a at a center portion. Base member 23 includes, at peripheral portions of opening 23a, positioning bosses 23b at positions corresponding to positioning holes 21c of coil substrate 21 and positioning holes 22b of sensor substrate 22. In addition, base member 23 includes, at the side walls, small recesses 23c at positions corresponding to first lock pieces 22c of sensor substrate 22, and large recesses 23d at positions corresponding to second lock pieces 22d of sensor substrate 22.

In addition, base member 23 includes, at peripheral portions of opening 23a, Hall device housing part 23f configured to house Hall devices 24A and 24B, terminal housing part 23e configured to house power source terminal 22e of sensor substrate 22, and recess 23g configured to prevent the weld line from overlapping terminal housing part 23e having a small thickness.

Hall devices 24A and 24B are disposed on the rear surface side of sensor substrate 22, and are housed in Hall device housing part 23f of base member 23. By detecting the magnetic field formed by magnet part 122 with Hall devices 24A and 24B, the position of OIS movable part 10 in the XY plane can be specified. It is to be noted that an XY-position detection magnet may be disposed at OIS movable part 10 in addition to magnet part 122.

At the time of assembling OIS fixing part 20, first, coil substrate 21 and sensor substrate 22 are bonded by soldering. In this manner, the power-source line (not illustrated) of sensor substrate 22 and OIS coil part 211 are electrically connected to each other.

Next, positioning holes 21c of coil substrate 21 and positioning holes 22b of sensor substrate 22 are fitted to positioning bosses 23b of base member 23 to dispose coil substrate 21 and sensor substrate 22 on base member 23. First lock pieces 22c of sensor substrate 22 are engaged with small recesses 23c of base member 23, and second lock pieces 22d of sensor substrate 22 are engaged with large recesses 23d, and thus, coil substrate 21 and sensor substrate 22 are fixed to base member 23. In this manner, OIS fixing part 20 are assembled.

As described, lens driving device 1 includes: OIS magnet part (magnet part 122) disposed at an AF unit including AF movable part (11) and AF fixing part (12); OIS coil part (211) disposed separately from OIS magnet part (122) in a light axis direction; and an OIS driving part configured to perform shake correction by swinging OIS movable part (10) including OIS magnet part (122) in a plane orthogonal to the light axis direction with respect to OIS fixing part (20) including OIS coil part (211) by utilizing a driving force of a voice coil motor composed of OIS coil part (211) and OIS magnet part (122).

At the time of assembling lens driving device 1, one ends of suspension wires 33A and 33B are respectively inserted to wire connecting part 132n of upper leaf spring 132 and wire connecting part 131n of upper leaf spring 131, and fixed thereto by soldering. One ends of suspension wires 32A and 32B are respectively inserted to wire connecting part 133c of power-source line part 133 and wire connecting part 134c of power-source line part 134 and fixed thereto by soldering. One ends of suspension wires 31A and 31B are respectively inserted to wire connecting part 135b of signal line part 135 and wire connecting part 136b of signal line part 136, and fixed thereto by soldering. With this configuration, suspension wire 30, and upper leaf springs 131 and 132, power-source line parts 133 and 134, and signal line parts 135 and 136 are electrically connected together.

Next, the other end (lower end) of suspension wire 30 is inserted to wire fixation hole 21b of coil substrate 21, and is fixed by soldering. In this manner, the power-source line and the signal line of sensor substrate 22 and suspension wire 30 are electrically connected to each other. That is, it is possible to perform power feeding to AF coil part 112 and Hall device 161 and operation control of Hall device 161 through suspension wire 30 and upper elastic supporting part 13.

Here, a damper (not illustrated) is disposed at wire insertion part 121g of magnet holder 121 so as to surround suspension wire 30. Thus the damper is interposed between magnet holder 121 and upper elastic supporting part 13. By interposing the damper (not illustrated) between magnet holder 121 and upper elastic supporting part 13, generation of unnecessary resonance (high-order resonance mode) can be reduced, and consequently, the stability of the operation can be ensured. The damper can be readily applied to wire insertion part 121g with use of a dispenser. For example, ultraviolet curing silicone gel can be adopted as the damper.

In addition, wire connecting parts 131n and 132n of upper leaf springs 131 and 132, wire connecting parts 133c and 134c of power-source line parts 133 and 134, and wire connecting parts 135b and 136b of signal line parts 135 and 136 are formed in a curved shape so as to be easily elastically deformed. The drop impact is absorbed by deflection of the above-mentioned parts and suspension wire 30, and therefore plastic deformation or rupture of suspension wire 30 does not occur.

Shield cover 2 is attached to lens driving device 1 in such a manner that engagement piece 2b of shield cover 2 makes contact with first lock piece 22c of sensor substrate 22. Since small recess 23c of base member 23 has a tapered shape, a biasing force acts between first lock piece 22c of sensor substrate 22 and engagement piece 2b of shield cover 2. Accordingly, shield cover 2 and sensor substrate 22 are electrically connected to each other without soldering. In this manner, shield cover 2 can be readily grounded, and EMC noise can be blocked.

At the time of shake correction in lens driving device 1, OIS coil part 211 is energized. When OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and to the direction of the current flowing through the long side portion of OIS coil part 211 (the X direction or the Y direction). Since OIS coil part 211 is fixed, a reactive force acts on magnet part 122. With this reactive force serving as the driving force of the OIS voice coil motor, OIS movable part 10 including magnet part 122 sways in the XY plane, and thus shake correction is performed.

At the time of automatic focusing in lens driving device 1, AF coil part 112 is energized. When AF coil part 112 is energized, a Lorentz force is generated at AF coil part 112 by interaction between the magnetic field of magnet part 122 and the current flowing through AF coil part 112. The direction of the Lorentz force is a direction (the Z direction) orthogonal to the direction of the magnetic field (X direction or Y direction) and to the direction of the current flowing through the AF coil part 112 (the Y direction or the X direction). Since magnet part 122 is fixed, a reactive force acts on AF coil part 112. With this reactive force serving as the driving force of the AF voice coil motor, AF movable part 11 including AF coil part 112 moves in the light axis direction, and thus focusing is performed.

Here, in an non-energization state where focusing is not performed, AF movable part 11 is suspended between the infinity position and the macro position with upper leaf springs 131 and 132 and lower leaf spring 14 (hereinafter referred to as "reference state"). That is, in OIS movable part 10, AF movable part 11 (lens holder 111) is elastically supported such that AF movable part 11 is displaceable in the Z direction in the state where the position of AF movable part 11 with respect to AF fixing part 12 (magnet holder 121) is set by upper leaf springs 131 and 132, and lower leaf spring 14.

At the time of focusing, the direction of the current is controlled based on whether AF movable part 11 is moved from the reference state toward the macro position side or toward the infinity position side. In addition, the value of the current is controlled based on the movement length of AF movable part 11.

When AF movable part 11 moves to the infinity position side at the time of focusing, the bottom surface of protruding part 111b of lens 111 holder approaches the top surface of magnet part 122, and finally makes contact with the top surface of magnet part 122. That is, the movement to the infinity position side is restricted by the bottom surface of protruding part 111b of lens holder 111 and the top surface of magnet part 122. When AF movable part 11 moves to the macro position side at the time of focusing, the top surface of protruding part 111b of lens holder 111 approaches the bottom surface of stopper part 121b of magnet holder 121, and finally makes contact with the bottom surface of stopper part 121b. That is, the movement to the macro position side is restricted by the top surface of protruding part 111b of lens holder 111 and the bottom surface of stopper part 121b of magnet holder 121.

Further, in the AF driving part of lens driving device 1, a closed loop control is performed based on a detection signal of position detection part 16. With the closed loop control method, the hysteresis characteristics of the voice coil motor are not required to be considered, and the stability of the position of AF movable part 11 can be directly detected. Furthermore, automatic focusing of an image surface detection method can be adopted. Accordingly, with high responsiveness, speedup of the automatic focusing operation can be achieved.

Figure 11:
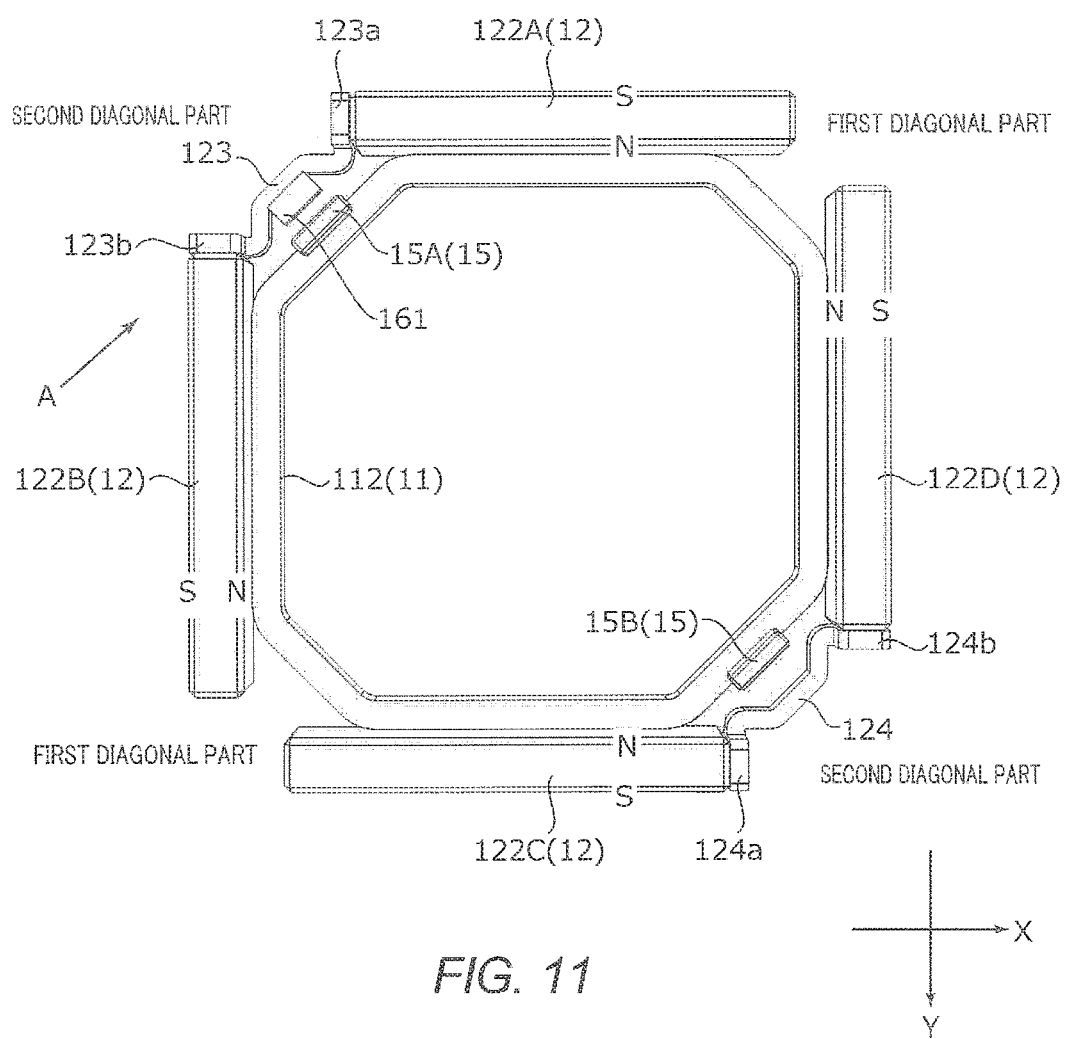
FIG. 11 is a plan view illustrating the positions of a Hall device and a position detection magnet.
Figure 12:
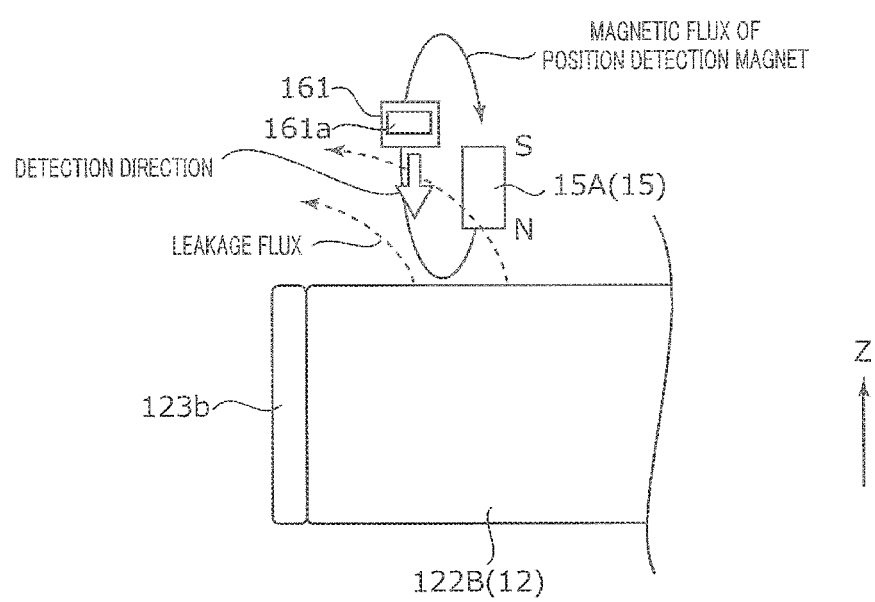
FIG. 12 is a side view illustrating the positions of the Hall device and a first position detection magnet.
Figure 13:
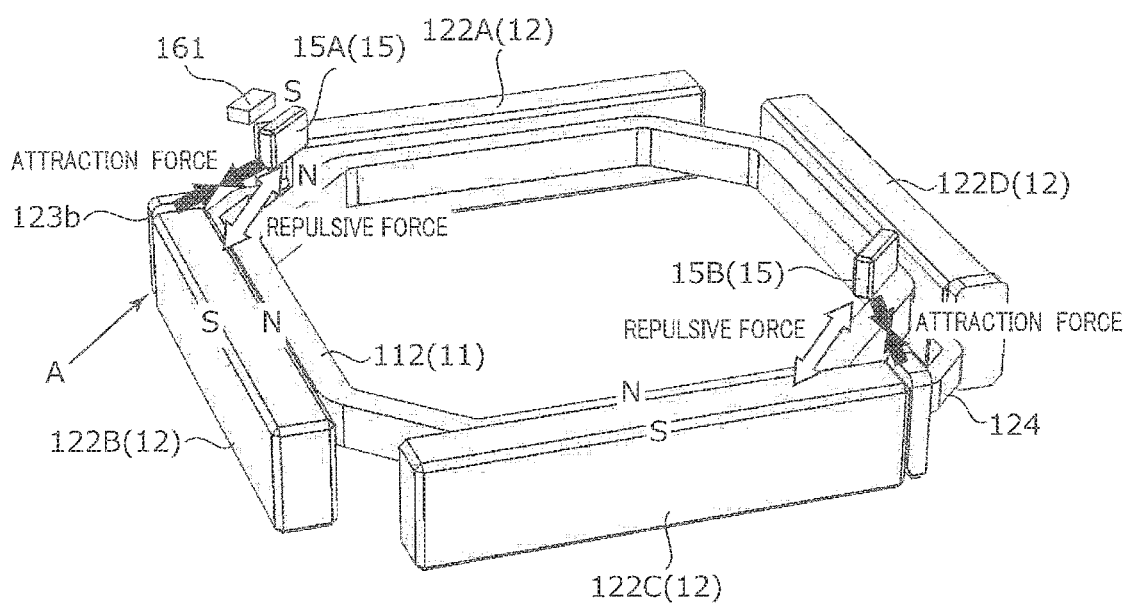
FIG. 13 is a perspective view illustrating the positions of the Hall device and the position detection magnet.

FIG. 11 is a plan view illustrating the positions of Hall device 161 and position detection magnet 15. FIG. 12 is a side view illustrating the positions of Hall device 161 and first position detection magnet 15A. FIG. 13 is a perspective view illustrating the positions of Hall device 161 and position detection magnet 15. In FIGS. 11 to 13, only AF coil part 112 is illustrated in AF movable part 11, and only magnet part 122 and coupling yokes 123 and 124 are illustrated in AF fixing part 12 for the purpose of clearly showing the positions of Hall device 161 and position detection magnet 15.

In the case where Hall device 161 is disposed at AF fixing part 12 and first position detection magnet 15A is disposed at AF movable part 11, it is desirable that the detection part of Hall device 161 intersect only the magnetic flux of first position detection magnet 15A. However, in the case where magnet part 122 is composed of four permanent magnets 122A to 122D and permanent magnets 122A to 122D are disposed in a square frame shape as in the present embodiment, the region for installing Hall device 161 is significantly limited, and therefore the influence of the leakage flux of magnet part 122 cannot be completely eliminated. That is, the detection part of Hall device 161 intersects the leakage flux of magnet part 122 to a certain degree. Consequently, the influence of the leakage flux of magnet part 122 results in an output voltage offset, and the dynamic range of the detection sensitivity is significantly reduced.

In the present embodiment, Hall device 161 is disposed at a position where the influence of the leakage flux of magnet part 122 is minimized. Specifically, since the influence of the leakage flux of magnet part 122 is minimized at the diagonal parts located at the four vertexes of the quadrangle, Hall device 161 is disposed at one of the second diagonal parts. In addition, Hall device 161 is disposed such that the detection direction of detection part 161a coincides with the light axis direction. In this case, the detection direction of Hall device 161 is substantially perpendicular to the leakage flux of magnet part 122. It is preferable to set the distance between Hall device 161 and magnet part 122 to a large value as much as possible as long as lens driving device 1 is not upsized. By disposing Hall device 161 in the above-mentioned manner, the influence of the leakage flux of magnet part 122 can be minimized.

On the other hand, first position detection magnet 15A disposed at AF movable part 11 is disposed at a position close to Hall device 161 as much as possible. In addition, first position detection magnet 15A is disposed such that the magnetization direction coincides with the light axis direction. With this configuration, the effective magnetic flux which intersects the detection part of Hall device 161 increases, and consequently the detection sensitivity of Hall device 161 is improved. It is to be noted that second position detection magnet 15B is disposed at a position point symmetrical with first position detection magnet 15A about the optical axis.

As described, lens driving device 1 includes: Hall device (161) disposed separately from AF magnet part (magnet part 122) in the light axis direction at a position corresponding to one diagonal part (one of second diagonal parts) of AF magnet part (122) such that the detection direction coincides with the light axis direction; first position detection magnet (15A) disposed at a position near Hall device (161) such that the magnetization direction coincides with the light axis direction; and second position detection magnet (15B) having a configuration similar to that of first position detection magnet (15A) and disposed at a position point symmetrical with first position detection magnet (15A) about the light axis direction.

With lens driving device 1, the influence of the leakage flux of magnet part 122 can be minimized, and the detection sensitivity of Hall device 161 is improved, and therefore, the position of AF movable part 11 in the light axis direction can be accurately detected. Accordingly, lens driving device 1 can achieve downsizing and power saving, and is useful for the case where automatic focusing is performed by a closed loop control method.

Here, the leakage flux of magnet part 122 has an influence not only on the detection sensitivity of Hall device 161, but also on the magnetic force which acts on first position detection magnet 15A. That is, in the case where the parts of first position detection magnet 15A and magnet part 122 close to each other have the same polarity, a repulsive force is generated therebetween, and in the case where the parts have opposite polarities, an attraction force is generated therebetween (see FIG. 13). While FIG. 13 illustrates an attraction force generated between first position detection magnet 15A and yoke part 123b and a repulsive force generated between first position detection magnet 15A and permanent magnet 122B, an attraction force is generated also between first position detection magnet 15A and yoke part 123a, and a repulsive force is generated also between first position detection magnet 15A and permanent magnet 122A. The same applies to the magnetic force generated at second position detection magnet 15B.

Since detection magnet 15B is disposed at the second position which is point symmetrical with first position detection magnet 15A about the optical axis, the translational acting force in the XY plane is offset. Accordingly, it suffices to consider the acting force of AF movable part 11 in the movement direction (the Z direction) as the acting force on AF movable part 11. Since the acting force in the Z direction to AF movable part 11 interferes with the movement operation of AF movable part 11, it is preferable that the acting force in the Z direction to AF movable part 11 be small as much as possible.

In the present embodiment, permanent magnet 122A includes yoke part 123a at the end surface in proximity to first position detection magnet 15A. In addition, permanent magnet 122B includes yoke part 123b at the end surface in proximity to first position detection magnet 15A. With yoke parts 123a and 123b thus disposed, the leakage flux of magnet part 122 is reduced, and the magnetic force (repulsive force or attraction force) between magnet part 122 and first position detection magnet 15A is reduced. Accordingly, the acting force in the movement direction to AF movable part 11 due to the leakage flux of magnet part 122 (hereinafter referred to as "acting force in the movement direction" or "acting force in the Z direction") is reduced.

In addition, when yoke parts 123a and 123b are disposed, the parts of first position detection magnet 15A and magnet part 122 close to each other preferably have the same polarity. In this case, the parts of second position detection magnet 15B and magnet part 122 close to each other also have the same polarity. A part or all of an attraction force generated between first position detection magnet 15A and yoke parts 123a and 123b is offset by a repulsive force generated between magnet part 122 and first position detection magnet 15A, and the acting force in the Z direction to AF movable part 11 is further reduced.

Figure 14:
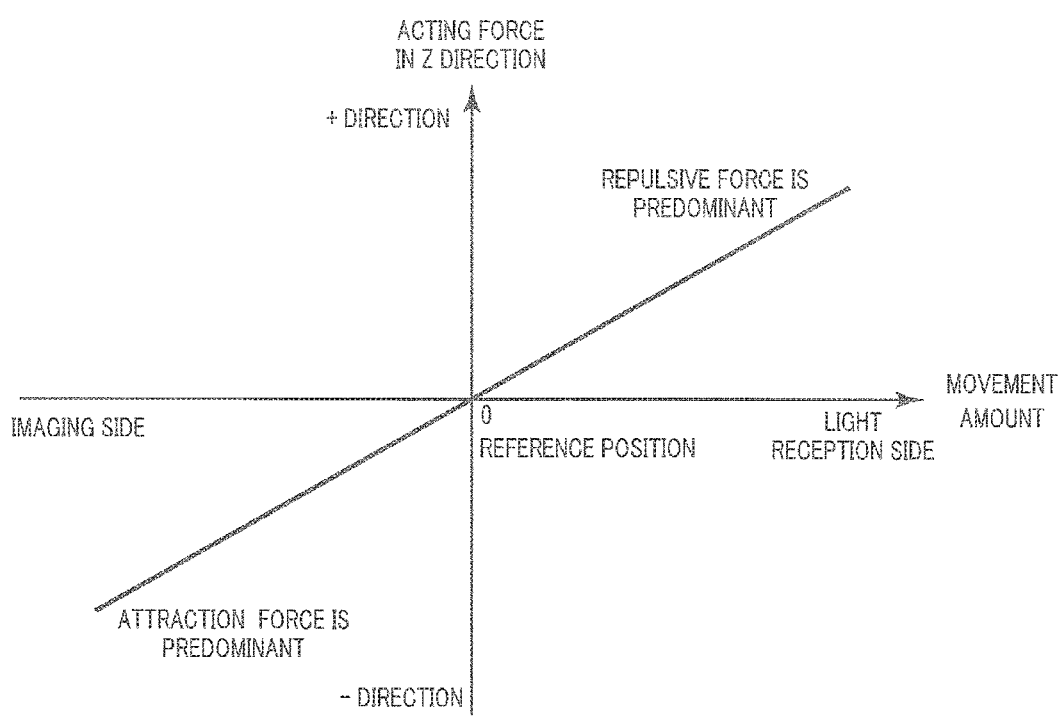
FIG. 14 illustrates an example of an acting force generated at an AF movable part in a movement direction (the Z direction)

As described above, while the acting force in the Z direction to AF movable part 11 can be reduced, the acting force in the Z direction varies along with the movement operation of AF movable part 11. In view of this, as illustrated in FIG. 14, it is preferable to select the positions and the types of first position detection magnet 15A and second position detection magnet 15B such that the acting force in the Z direction to AF movable part 11 is 0 at the reference position, and that the repulsive force is predominant and the acting force in the Z direction of + direction is generated when AF movable part 11 is moved to the light reception side in the light axis direction whereas the attraction force is predominant and the acting force in the Z direction of − direction is generated when AF movable part 11 is moved to the image pickup side in the light axis direction.

In this case, first position detection magnet 15A, second position detection magnet 15B, and magnet part 122 can be regarded as springs opposite to upper leaf springs 131 and 132, and lower leaf spring 14. That is, when AF movable part 11 is moved, the acting force in the Z direction is generated in the direction opposite to the restoration force generated at upper leaf springs 131 and 132 and lower leaf spring 14.

As described, lens driving device 1 includes an auxiliary magnet (position detection magnet 15) in which the acting force in the Z direction to AF movable part (11) is 0 at the reference position of AF movable part (11), and the acting force in the Z direction is generated in the direction opposite to the restoration force of the elastic supporting part when AF movable part (11) is moved. To be more specific, auxiliary magnet (15) includes a first auxiliary magnet (first position detection magnet 15A) disposed separately from AF magnet part (magnet part 122) in the light axis direction and disposed at a position corresponding to one diagonal part of AF magnet part (122), and a second auxiliary magnet having a configuration similar to that of first auxiliary magnet (15A) and disposed at a position point symmetrical with first auxiliary magnet (15A) about the light axis direction.

With this configuration, even when the rigidity of upper leaf springs 131 and 132 and lower leaf spring 14 is increased, a desired spring constant as a whole can be achieved. By increasing the rigidity of upper leaf springs 131 and 132 and lower leaf spring 14, the frequency of the unnecessary resonance is increased, and the servo stability is improved, and therefore, the degree of freedom of the servo design is increased. In addition, the OIS tilt characteristics can be improved.

<Modification>

In recent years, along with the increase in number of pixels of cameras, the heat generated by the imaging device has increasingly posed problems. For example, when the temperature of a Hall device increases under the influence of the heat generated by the imaging device, the property of the Hall device is changed, and the position of the AF movable part cannot be accurately detected.

To solve this problem, in the embodiment of the present invention, preferably, the lens driving device is provided with a temperature detection part configured to detect the temperature of a region around the Hall device, and the output of the Hall device is corrected based on the temperature detected by the temperature detection part, to thereby detect the position of the AF movable part. In the following description, a case is described in detail in which position detection substrate 170 provided with temperature detection part 180 is used in place of position detection substrate 162 described in the embodiment, with reference to FIG. 15 and FIG. 16.

Figures 15A, 15B:
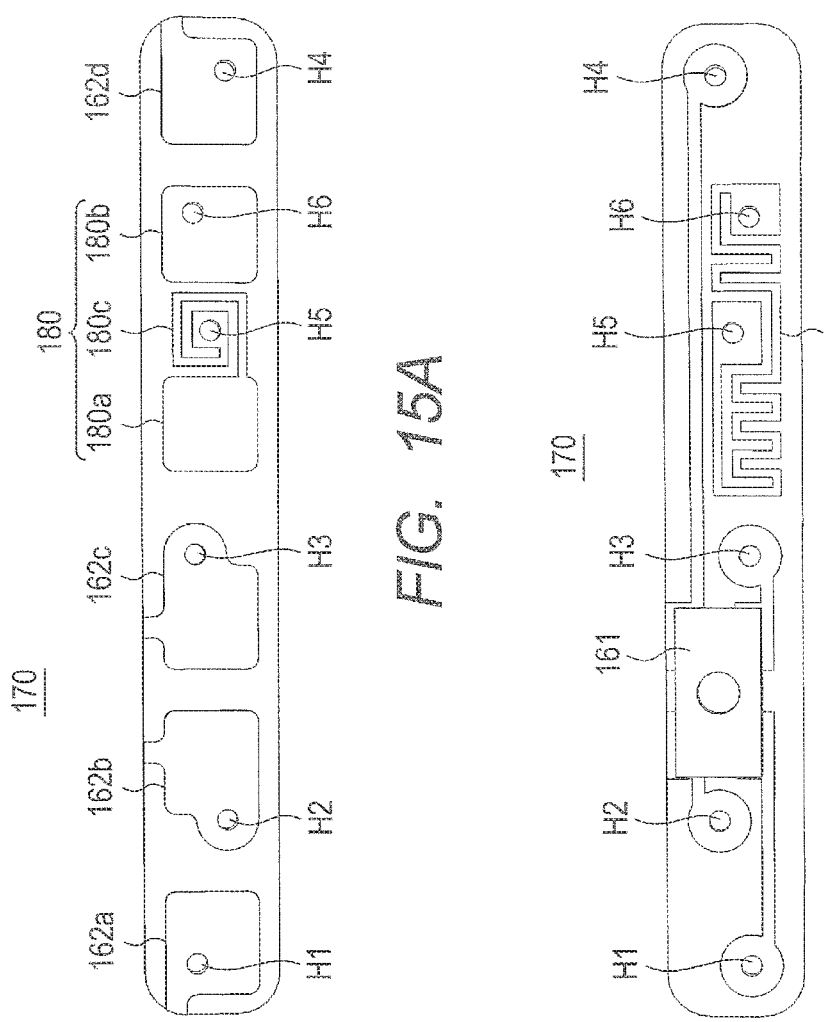
FIG. 15A is a plan view illustrating a first surface of a position detection substrate.
FIG. 15B is a plan view illustrating a second surface of a position detection substrate.
Figure 16:
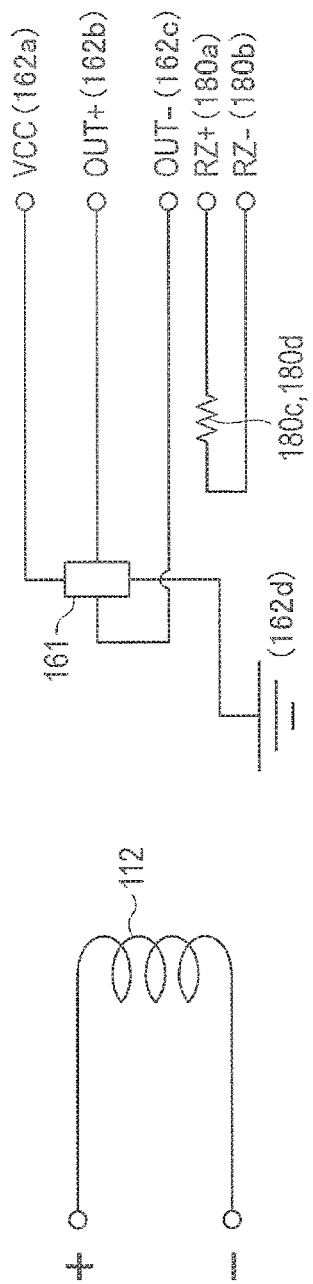
FIG. 16 is a circuit diagram illustrating the position detection substrate.

FIG. 15A is a plan view illustrating a first surface of position detection substrate 170, and FIG. 15B is a plan view illustrating a second surface (a surface opposite to the first surface) of position detection substrate 170. FIG. 16 is a circuit diagram illustrating position detection substrate 170.

As illustrated in FIG. 15A, as with position detection substrate 162 of the embodiment, power source terminals 162a and 162d and signal terminals 162b and 162d are provided on the first surface of position detection substrate 170. In addition, as illustrated in FIG. 15B, Hall device 161 of the embodiment is provided on the second surface of position detection substrate 170.

In addition, as illustrated in FIG. 15A and FIG. 15B, power source terminals 162a and 162d and signal terminals 162b and 162d are connected with a copper foil pattern provided on the second surface via through holes H1 to H4.

In addition, as illustrated in FIG. 15A and FIG. 15B, position detection substrate 170 is provided with temperature detection part 180 that detects temperature of a region around Hall device 161.

As illustrated in FIG. 15A and FIG. 15B, temperature detection part 180 includes signal terminals 180a and 180b and copper foil patterns 180c and 180d (an example of the resistance circuit). Signal terminals 180a and 180b and copper foil pattern 180c are provided on the first surface of position detection substrate 170. In addition, copper foil pattern 180c is provided on the second surface of position detection substrate 170.

To accurately detect resistance variation in association with temperature change, it is preferable that copper foil patterns 180c and 180d have a large resistance value as much as possible. Here, copper foil pattern 180c is formed in a spiral form, and copper foil pattern 180d is formed in a zigzag form.

In addition, as illustrated in FIG. 15A and FIG. 15B, copper foil pattern 180c is connected with the copper foil pattern provided on the second surface via through hole H5. In addition, signal terminal 180b is connected with the copper foil pattern provided on the second surface via through hole H6.

Temperature detection part 180 having the above-mentioned configuration detects the resistance value of copper foil patterns 180c and 180d. A signal of the detected resistance value (hereinafter referred to as "resistance value signal") is output to a control part (which is not illustrated in the drawing in the drawing, and is, for example, a control part of camera module A or a control part of smartphone M) that controls focusing of an auto focus function through a path described later.

A configuration of the path of the above-described resistance value signal is described below.

Upper elastic supporting part 13 (see FIG. 5) includes, in addition to upper leaf springs 131 and 132, power-source line parts 133 and 134, and signal line parts 135 and 136 of the embodiment, two signal line parts (which are not illustrated in the drawing in the drawing, and are hereinafter referred as "first resistance value signal line part" and "second resistance value signal line part") that extract a resistance value signal from temperature detection part 180.

One end of the first resistance value signal line part is soldered and electrically connected to signal terminal 180a of temperature detection part 180. In addition, one end of the second resistance value signal line part is soldered and electrically connected to signal terminal 180b of temperature detection part 180.

Suspension wire 30 (see FIG. 4) includes, in addition to suspension wires 31A, 31B, 32A, 32B, 33A and 33B of the embodiment, two resistance value signal suspension wires (which are not illustrated in the drawing in the drawing, and are hereinafter referred to as "first resistance value signal suspension wire" and "second resistance value signal suspension wire") that are used as a path of a resistance value signal.

One end (upper end) of the first resistance value signal suspension wire is fixed to the first resistance value signal line part of upper elastic supporting part 13, and the other end (lower end) thereof is fixed to coil substrate 21 (see FIG.

10). In addition, one end (upper end) of the second resistance value signal suspension wire is fixed to the second resistance value signal line part of upper elastic supporting part 13, and the other end (lower end) thereof is fixed to coil substrate 21 (see FIG. 10). Coil substrate 21 is electrically connected with the above-described control part through a path not illustrated in the drawing.

A resistance value signal output from temperature detection part 180 is input to the above-described control part through the path having the above-mentioned configuration. The control part corrects the position of AF movable part 11 in the Z direction (light axis direction) based on the resistance value signal and the detection signal input from Hall device 161, and performs current supply in accordance with the corrected position to thereby control the movement of AF movable part 11.

In the above-mentioned manner, according to the present modification, the position of AF movable part 11 can be accurately detected even in the case where the temperature of a region around Hall device 161 is changed by heat generated by the imaging device and the like. As a result, automatic focusing is performed by an appropriate closed loop control, and thus focus shifting can be prevented.

While signal terminals 180a and 180b and copper foil pattern 180c are provided on the first surface of position detection substrate 170, and copper foil pattern 180c is provided on the second surface of position detection substrate 170 in the present modification, signal terminals 180a and 180b and copper foil patterns 180c and 180d may be provided on one of the first and second surfaces of position detection substrate 170, or may be embedded in position detection substrate 170.

While the resistance circuit of copper foil patterns 180c and 180d is utilized as temperature detection part 180 in the present modification, temperature detection part 180 may detect the temperature based on the resistance value of Hall device 161.

While the resistance circuit of copper foil patterns 180c and 180d is utilized as temperature detection part 180 in the present modification, copper foil patterns 180c and 180d may be replaced by a chip resistance component. In this case, a larger resistance value relative to the area of position detection substrate 170 may be ensured, and thus the temperature can be further accurately detected even when the detection resolution of the resistance value variation is rough.

In addition, in the present modification, in addition to temperature detection part 180 that detects the temperature of a region around Hall device 161, a temperature detection part (hereinafter referred to as "the second temperature detection part") that detects the temperature of a region around Hall device 24A, and a temperature detection part (hereinafter referred to as "the third temperature detection part") that detects the temperature of a region around Hall device 24B may also be provided. For example, the second temperature detection part and the third temperature detection part have a configuration similar to that of temperature detection part 180, and output a resistance value signal to the control part. The control part corrects a detection signal input from Hall device 24A and a detection signal input from Hall device 24B based on a resistance value signal (the temperature of a region around Hall devices 24A and 24B), and detects the position in the XY plane of OIS movable part 10. The control part performs current supply in accordance with the corrected position to control the swing of OIS movable part 10. It is to be noted that only one of the second temperature detection part and the third temperature detection part may be employed.

While the invention made by the present inventor has been specifically described based on the preferred embodiments, it is not intended to limit the present invention to the above-mentioned preferred embodiments but the present invention may be further modified within the scope and spirit of the invention defined by the appended claims.

While lens driving device 1 has an AF function and an OIS function in the embodiment, the present invention may also be applied to a lens driving device having only an AF function, for example. In addition, while yoke parts 123a, 123b, 124a, and 124b are disposed at respective end surfaces of permanent magnets 122A to 122D in the longitudinal direction, yoke parts 123a, 123b, 124a, and 124b may be omitted.

While a smartphone as a camera-equipped mobile terminal is the camera mounting device including camera module A in the embodiment, the present invention is also applicable to an camera mounting device which is an information device or a transporting device, for example. A camera mounting device which is an information device is a device which includes a camera module and a control part that processes image information obtained with the camera module, and includes, for example, a camera-equipped mobile phone, a note-type personal computer, a tablet terminal, a mobile game machine, a webcamera, a camera-equipped in-vehicle device (such as a rear-view monitor device and drive recorder). In addition, a camera mounting device which is a transport device is a device which includes a camera module and a control part that processes an image obtained with the camera module, and is, for example, an automobile.

Figure 17A:
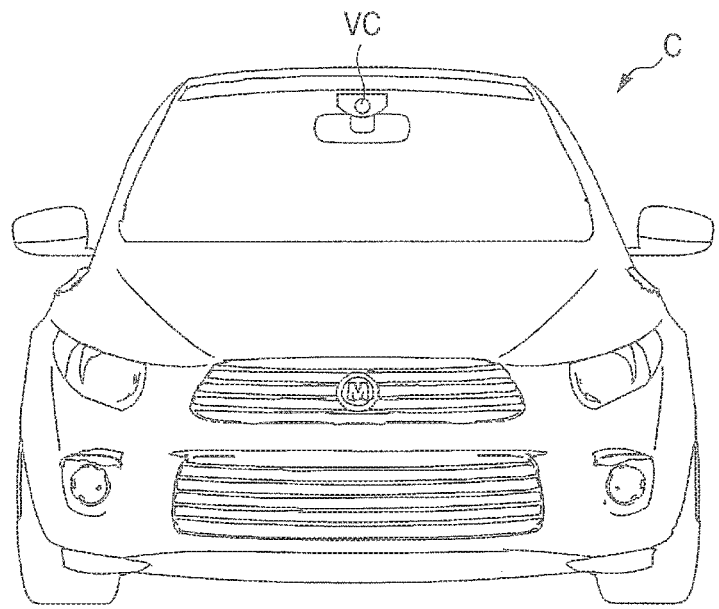
FIG. 17A is a front view of automobile.
Figure 17B:
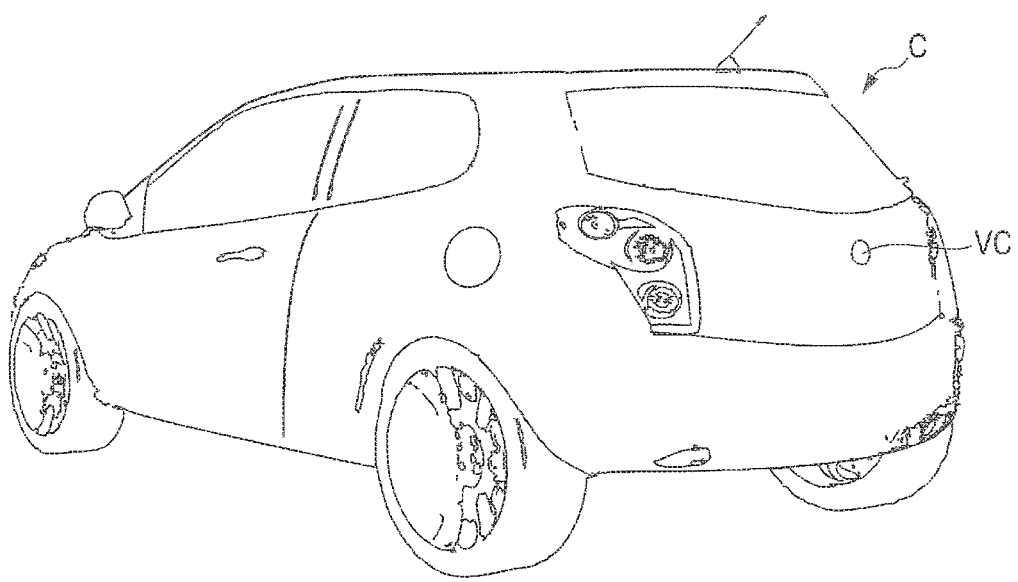
FIG. 17B is a rear perspective view of automobile.

FIGS. 17A and 17B illustrate automobile C as a camera mounting device in which a camera module VC (Vehicle Camera) is mounted. FIG. 17A is a front view of automobile C, and FIG. 17B is a rear perspective view of automobile C. Automobile C includes camera module A of the embodiment as in-vehicle camera module VC. As illustrated in FIGS. 17A and 17B, in-vehicle camera module VC is attached on the front glass to face the front direction and/or attached on the rear gate to face the rear direction, for example. The in-vehicle camera module VC is used for the rear-view monitor, the drive recorder, the collision-avoidance control, the automatic operation control and the like.

The embodiment disclosed herein is merely an exemplification and should not be considered as limitative. The scope of the present invention is specified by the following claims, not by the above-mentioned description. It should be understood that various modifications, combinations, subcombinations and alterations may occur depending on design requirements and other factors in so far as they are within the scope of the appended claims or the equivalents thereof. Although embodiments of the present invention has been described and illustrated in detail, it is clearly understood that the same is by way of illustrated and example only and is not to be taken by way of limitation, the scope of the present invention being interpreted by terms of the appended claims.

This application is entitled to and claims the benefit of Japanese Patent Application No. 2014-143589 dated Jul. 11, 2014, the disclosure of which including the specification, drawings and abstract is incorporated herein by reference in its entirety.

REFERENCE SIGNS LIST

1 Lens driving device
2 Shield cover

10 OIS movable part (AF driving part)
11 AF movable part
111 Lens holder
112 AF coil part
12 AF fixing part
121 Magnet holder
122 Magnet part (AF magnet part, OIS magnet part)
122A to 122D Permanent magnet
13 Upper elastic supporting part
131, 132 Upper leaf spring
133, 134 Power-source line part
135, 136 Signal line part
14 Lower elastic supporting part, lower leaf spring
15 Position detection magnet
15A First position detection magnet
15B Second position detection magnet
16 Position detection part
161 Hall device
162, 170 Position detection substrate
180 Temperature detection part
20 OIS fixing part
21 Coil substrate
211 OIS coil part
211A to 211D OIS coil
22 Sensor substrate
23 Base member
30 Supporting member
31A, 31B Signal suspension wire
32A, 32B Hall device feeding suspension wire
33A, 33B Coil feeding suspension wire
M Smartphone
A Camera module
H1 to H6 Through hole

What is claimed is:

1. A lens driving device comprising an auto-focusing driving part,
the auto-focusing driving part including:
an auto-focusing coil part disposed at a periphery of a lens part; and
an auto-focusing magnet part composed of four permanent magnets and disposed separately from the auto-focusing coil part in a radial direction, wherein
the auto-focusing driving part is configured to move an auto focus movable part including the auto-focusing coil part in a light axis direction with respect to an auto focus fixing part including the auto-focusing magnet part, wherein
the auto focus fixing part includes:
a Hall device being disposed separately from the auto-focusing magnet part;
a first position detection magnet being disposed in proximity to the Hall device; and
a second position detection magnet having a configuration similar to that of the first position detection magnet, and the second position detection magnet being disposed at a position point symmetrical with the first position detection magnet about the light axis direction, wherein
a magnetic force which acts on the auto focus movable part is balanced.

2. The lens driving device according to claim 1 further comprising a shake-correcting driving part,
the shake-correcting driving part including:
a shake-correcting magnet part disposed at an auto focus unit including the auto focus movable part and the auto focus fixing part; and
a shake-correcting coil part disposed separately from the shake-correcting magnet part in the light axis direction;
the shake-correcting driving part being configured to swing a shake-correcting movable part including the shake-correcting magnet part in a plane orthogonal to the light axis direction with respect to a shake-correcting fixing part including the shake-correcting coil part.

3. The lens driving device according to claim 2, wherein the auto-focusing magnet part serves also as the shake-correcting magnet.

4. A camera module comprising:
the lens driving device according to claim 1;
a lens part mounted to the auto focus movable part; and
an image capturing part configured to capture a subject image imaged by the lens part.

5. A camera mounting device comprising:
the camera module according to claim 4;
the camera mounting device being an information device or a transport device.

6. The lens driving device according to claim 1, wherein:
parts of the first position detection magnet and the auto-focusing magnet part which are close to each other have the same polarity; and
parts of the second position detection magnet and the auto-focusing magnet part which are close to each other have the same polarity.

* * * * *